United States Patent
Doering et al.

(10) Patent No.: US 9,501,541 B2
(45) Date of Patent: Nov. 22, 2016

(54) SEPARATION OF POD PROVISIONING AND SERVICE PROVISIONING

(71) Applicant: Oracle International Corporation, Redwood Shores, CA (US)

(72) Inventors: Jeffrey Ryan Doering, Bend, OR (US); Nirmalya Sen, San Jose, CA (US); Ying Gao, San Jose, CA (US); Khushboo Bhatia, Mars, PA (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 434 days.

(21) Appl. No.: 13/844,018

(22) Filed: Mar. 15, 2013

(65) Prior Publication Data

US 2014/0075031 A1   Mar. 13, 2014

Related U.S. Application Data

(60) Provisional application No. 61/698,413, filed on Sep. 7, 2012, provisional application No. 61/698,459, filed on Sep. 7, 2012, provisional application No. 61/785,299, filed on Mar. 14, 2013.

(51) Int. Cl.
  *G06F 9/455* (2006.01)
  *G06F 17/30* (2006.01)
  (Continued)

(52) U.S. Cl.
  CPC ... *G06F 17/30575* (2013.01); *G06F 17/30082* (2013.01); *G06F 17/30283* (2013.01);
  (Continued)

(58) Field of Classification Search
  CPC .... G06F 9/5072; G06F 9/45558; G06F 8/60; G06F 2009/45562; H04L 67/10
  See application file for complete search history.

(56) References Cited

U.S. PATENT DOCUMENTS 4,939,723 A   7/1990   Harley, Jr. et al.
5,892,909 A   4/1999   Grasso et al.
(Continued)

FOREIGN PATENT DOCUMENTS

CN   104604201 A   5/2015
CN   104737517 A   6/2015
(Continued)

OTHER PUBLICATIONS

Ranganathan, Sridhar. Architecting the Oracle VM solution using the Oracle Sun ZFS Storage Appliances and Oracle Sun Servers. Sep. 2010 [retrieved on Jun. 2, 2015]. Retrieved from the Internet <URL: http://www.oracle.com/technetwork/articles/systems-hardware-architecture/vm-solution-using-zfs-storage-174070.pdf>.*

(Continued)

*Primary Examiner* — Kevin Bates
*Assistant Examiner* — Dae Kim
(74) *Attorney, Agent, or Firm* — Kilpatrick Townsend & Stockton LLP

(57) ABSTRACT

A method for POD provisioning and service provisioning is disclosed. The method may comprise storing, by a cloud infrastructure system, subscription order information from a customer identifying a service from a set of cloud services provided by the cloud infrastructure system, the cloud infrastructure system comprising one or more computing devices, wherein the subscription order information includes customer-specific configuration. Additionally, the method may comprise determining, by a computing device from the one or more computing devices, a service associated with the subscription order information. Moreover, the method may comprise mapping a pre-provisioned anonymous deployment to the subscription order information, wherein the pre-provisioned anonymous deployment is specifically pre-provisioned for the determined service. Furthermore, the method may comprise creating, by a computing device from the one or more computing devices, a service instance specifically for the customer by configuring the pre-provisioned anonymous deployment with the customer-specific configuration.

20 Claims, 23 Drawing Sheets

(51) Int. Cl.
*G06Q 10/06* (2012.01)
*G06Q 30/06* (2012.01)
*H04L 12/24* (2006.01)
*H04L 12/26* (2006.01)
*H04L 12/911* (2013.01)
*H04L 29/06* (2006.01)

(52) U.S. Cl.
CPC ..... *G06F17/30339* (2013.01); *G06Q 10/0633* (2013.01); *G06Q 10/06315* (2013.01); *G06Q 30/0633* (2013.01); *G06Q 30/0635* (2013.01); *H04L 41/00* (2013.01); *H04L 41/0686* (2013.01); *H04L 41/50* (2013.01); *H04L 41/5041* (2013.01); *H04L 41/5054* (2013.01); *H04L 41/5064* (2013.01); *H04L 43/0876* (2013.01); *H04L 47/70* (2013.01); *H04L 63/10* (2013.01); *H04L 63/20* (2013.01); *G06F 17/30174* (2013.01)

(56) References Cited

U.S. PATENT DOCUMENTS

| | | |
|---|---|---|
| 5,911,143 A | 6/1999 | Deinhart et al. |
| 6,052,684 A | 4/2000 | Du |
| 6,085,188 A | 7/2000 | Bachmann et al. |
| 6,222,832 B1 | 4/2001 | Proctor |
| 6,236,988 B1 | 5/2001 | Aldred |
| 6,516,416 B2 | 2/2003 | Gregg et al. |
| 6,526,513 B1 | 2/2003 | Shrader et al. |
| 6,553,364 B1 | 4/2003 | Wu |
| 6,611,506 B1 | 8/2003 | Huang et al. |
| 6,650,433 B1 | 11/2003 | Keane et al. |
| 6,976,798 B2 | 12/2005 | Keane et al. |
| 7,031,967 B2 | 4/2006 | Cheng et al. |
| 7,051,039 B1 | 5/2006 | Murthy et al. |
| 7,130,839 B2 | 10/2006 | Boreham et al. |
| 7,136,867 B1 | 11/2006 | Chatterjee et al. |
| 7,290,288 B2 | 10/2007 | Gregg et al. |
| 7,664,866 B2 | 2/2010 | Wakefield |
| 7,790,393 B2 | 9/2010 | Lyamichev et al. |
| 7,921,299 B1 | 4/2011 | Anantha et al. |
| 7,953,896 B2 | 5/2011 | Ward et al. |
| 7,992,194 B2 | 8/2011 | Damodaran et al. |
| 8,095,629 B2 | 1/2012 | Ward et al. |
| 8,151,323 B2 | 4/2012 | Harris et al. |
| 8,165,152 B2 | 4/2012 | Sammour et al. |
| 8,214,747 B1 | 7/2012 | Yankovich et al. |
| 8,266,616 B1 * | 9/2012 | Jacquot ............. G06F 8/65 717/121 |
| 8,291,490 B1 | 10/2012 | Ahmed et al. |
| 8,321,921 B1 | 11/2012 | Ahmed et al. |
| 8,387,136 B2 | 2/2013 | Lee et al. |
| 8,387,137 B2 | 2/2013 | Lee et al. |
| 8,402,514 B1 | 3/2013 | Thompson et al. |
| 8,434,129 B2 | 4/2013 | Kannappan et al. |
| 8,468,244 B2 | 6/2013 | Redlich et al. |
| 8,499,005 B2 | 7/2013 | Brooks et al. |
| 8,572,602 B1 | 10/2013 | Colton et al. |
| 8,631,477 B2 | 1/2014 | Chen et al. |
| 8,631,478 B2 | 1/2014 | Chen et al. |
| 8,769,622 B2 | 7/2014 | Chang et al. |
| 8,769,704 B2 | 7/2014 | Peddada et al. |
| 8,789,157 B2 | 7/2014 | Sinn |
| 8,806,593 B1 | 8/2014 | Raphel et al. |
| 8,843,997 B1 | 9/2014 | Hare |
| 8,856,082 B2 | 10/2014 | Hale et al. |
| 9,053,302 B2 | 6/2015 | Sastry et al. |
| 9,058,471 B2 | 6/2015 | Sastry et al. |
| 9,203,866 B2 | 12/2015 | Chatterjee et al. |
| 9,219,749 B2 | 12/2015 | Khalsa et al. |
| 9,336,030 B1 | 5/2016 | Marr et al. |
| 9,336,483 B1 | 5/2016 | Abeysooriya et al. |
| 2002/0004390 A1 | 1/2002 | Cutaia et al. |
| 2002/0059210 A1 | 5/2002 | Makus et al. |
| 2002/0091863 A1 | 7/2002 | Schug |
| 2004/0243941 A1 | 12/2004 | Fish |
| 2005/0086239 A1 | 4/2005 | Swann et al. |
| 2005/0144033 A1 | 6/2005 | Vreeke et al. |
| 2005/0273346 A1 | 12/2005 | Frost |
| 2005/0289072 A1 | 12/2005 | Sabharwal |
| 2006/0059539 A1 | 3/2006 | Shashikumar et al. |
| 2006/0143704 A1 | 6/2006 | Rits et al. |
| 2006/0277595 A1 | 12/2006 | Kinser et al. |
| 2007/0005536 A1 | 1/2007 | Caswell et al. |
| 2007/0028098 A1 | 2/2007 | Baartman et al. |
| 2007/0150480 A1 | 6/2007 | Hwang et al. |
| 2007/0169168 A1 | 7/2007 | Lim |
| 2007/0283147 A1 | 12/2007 | Fried et al. |
| 2008/0080718 A1 | 4/2008 | Meijer et al. |
| 2008/0083036 A1 | 4/2008 | Ozzie et al. |
| 2008/0089520 A1 | 4/2008 | Kessler |
| 2008/0147584 A1 | 6/2008 | Buss |
| 2008/0155039 A1 | 6/2008 | Fernandes et al. |
| 2008/0189250 A1 | 8/2008 | Cha et al. |
| 2008/0250074 A1 | 10/2008 | Parkinson |
| 2008/0256606 A1 | 10/2008 | Koikara et al. |
| 2008/0281617 A1 | 11/2008 | Conrad et al. |
| 2008/0313716 A1 | 12/2008 | Park |
| 2009/0024522 A1 | 1/2009 | Reunert et al. |
| 2009/0089407 A1 * | 4/2009 | Chalupa ............. G06F 15/16 709/220 |
| 2009/0097657 A1 | 4/2009 | Scheidt et al. |
| 2009/0126007 A1 | 5/2009 | Zamberlan et al. |
| 2009/0144729 A1 | 6/2009 | Guizar |
| 2009/0178102 A1 | 7/2009 | Alghathbar et al. |
| 2009/0205018 A1 | 8/2009 | Ferraiolo et al. |
| 2009/0217267 A1 * | 8/2009 | Gebhart ............. G06F 9/5027 718/100 |
| 2009/0259683 A1 * | 10/2009 | Murty ............. G06F 17/30607 |
| 2009/0265753 A1 | 10/2009 | Anderson et al. |
| 2009/0293046 A1 | 11/2009 | Cheriton |
| 2009/0300604 A1 | 12/2009 | Barringer |
| 2009/0320093 A1 | 12/2009 | Glazier et al. |
| 2010/0114618 A1 | 5/2010 | Wilcock et al. |
| 2010/0125477 A1 | 5/2010 | Mousseau et al. |
| 2010/0191774 A1 | 7/2010 | Mason, Jr. et al. |
| 2010/0198730 A1 | 8/2010 | Ahmed et al. |
| 2010/0211781 A1 | 8/2010 | Auradkar et al. |
| 2010/0306818 A1 | 12/2010 | Li et al. |
| 2010/0333116 A1 | 12/2010 | Prahlad et al. |
| 2011/0035444 A1 | 2/2011 | Hill |
| 2011/0126207 A1 | 5/2011 | Wipfel et al. |
| 2011/0131146 A1 | 6/2011 | Skutnik |
| 2011/0131309 A1 | 6/2011 | Akiyama et al. |
| 2011/0138051 A1 | 6/2011 | Dawson et al. |
| 2011/0138055 A1 | 6/2011 | Daly et al. |
| 2011/0145199 A1 | 6/2011 | Prasad |
| 2011/0288968 A1 | 11/2011 | King et al. |
| 2011/0295998 A1 | 12/2011 | Ferris et al. |
| 2011/0296000 A1 | 12/2011 | Ferris et al. |
| 2011/0296018 A1 | 12/2011 | Deng et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2011/0320605 A1 | 12/2011 | Kramer et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0041844 A1 | 2/2012 | Shen et al. |
| 2012/0047357 A1 | 2/2012 | Bealkowski |
| 2012/0066755 A1 | 3/2012 | Peddada et al. |
| 2012/0072555 A1 | 3/2012 | DeLuca et al. |
| 2012/0079134 A1 * | 3/2012 | Outhred ............. H04L 12/4641 709/244 |
| 2012/0096521 A1 | 4/2012 | Peddada |
| 2012/0131166 A1 | 5/2012 | Barbedette et al. |
| 2012/0131194 A1 * | 5/2012 | Morgan ............. G06F 9/5072 709/226 |
| 2012/0136936 A1 | 5/2012 | Quintuna |

(56) References Cited

U.S. PATENT DOCUMENTS

| | | | |
|---|---|---|---|
| 2012/0221454 A1 | 8/2012 | Morgan |
| 2012/0226796 A1 | 9/2012 | Morgan |
| 2012/0226808 A1 | 9/2012 | Morgan |
| 2012/0233220 A1 | 9/2012 | Kaschenvsky et al. |
| 2012/0246248 A1 | 9/2012 | Arita |
| 2012/0271949 A1 | 10/2012 | Radhakrishnan et al. |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311154 A1 | 12/2012 | Morgan |
| 2013/0007195 A1 | 1/2013 | Rinard et al. |
| 2013/0007265 A1 | 1/2013 | Benedetti et al. |
| 2013/0014107 A1 | 1/2013 | Kirchhofer |
| 2013/0047230 A1 | 2/2013 | Krishnan et al. |
| 2013/0054763 A1 | 2/2013 | Van der Merwe et al. |
| 2013/0110943 A1 | 5/2013 | Menon et al. |
| 2013/0124401 A1 | 5/2013 | Del Real |
| 2013/0139152 A1* | 5/2013 | Chang ............. G06F 9/45545 718/1 |
| 2013/0152183 A1 | 6/2013 | Plewnia et al. |
| 2013/0204994 A1 | 8/2013 | Deshmukh et al. |
| 2013/0212160 A1 | 8/2013 | Lawson et al. |
| 2013/0212420 A1 | 8/2013 | Lawson et al. |
| 2013/0227137 A1* | 8/2013 | Damola ............. G06F 9/5072 709/224 |
| 2013/0254882 A1 | 9/2013 | Kannappan et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0290710 A1 | 10/2013 | Broder et al. |
| 2013/0298212 A1 | 11/2013 | Shah et al. |
| 2013/0318241 A1 | 11/2013 | Acharya et al. |
| 2013/0332984 A1 | 12/2013 | Sastry et al. |
| 2013/0332985 A1 | 12/2013 | Sastry et al. |
| 2014/0020054 A1 | 1/2014 | Lim |
| 2014/0059002 A1 | 2/2014 | Lockhart et al. |
| 2014/0059226 A1 | 2/2014 | Messerli et al. |
| 2014/0074539 A1 | 3/2014 | Doering et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |
| 2014/0074788 A1 | 3/2014 | Chatterjee et al. |
| 2014/0074793 A1 | 3/2014 | Doering et al. |
| 2014/0074999 A1 | 3/2014 | Khalsa et al. |
| 2014/0075016 A1 | 3/2014 | Chatterjee et al. |
| 2014/0075027 A1 | 3/2014 | Chatterjee et al. |
| 2014/0075032 A1 | 3/2014 | Vasudevan et al. |
| 2014/0075033 A1 | 3/2014 | Doering et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0075501 A1 | 3/2014 | Srinivasan et al. |
| 2014/0075565 A1 | 3/2014 | Srinivasan et al. |
| 2014/0082749 A1 | 3/2014 | Holland et al. |
| 2014/0141743 A1 | 5/2014 | Shaw |
| 2014/0143083 A1 | 5/2014 | Prathipati et al. |
| 2014/0201345 A1 | 7/2014 | Abuelsaad et al. |
| 2014/0237502 A1 | 8/2014 | Kelsen et al. |
| 2014/0280943 A1 | 9/2014 | Bobrov et al. |
| 2015/0067171 A1 | 3/2015 | Yum et al. |
| 2015/0074279 A1* | 3/2015 | Maes .................. G06F 9/5072 709/226 |
| 2015/0363724 A1 | 12/2015 | Chatterjee et al. |
| 2015/0365301 A1 | 12/2015 | Chatterjee et al. |
| 2016/0028581 A1 | 1/2016 | Khalsa et al. |

FOREIGN PATENT DOCUMENTS

| | | |
|---|---|---|
| CN | 104756460 A | 7/2015 |
| EP | 0538464 | 4/1993 |
| EP | 1914951 A1 | 4/2008 |
| EP | 2458548 A1 | 5/2012 |
| EP | 2893683 A | 7/2015 |
| EP | 2893684 | 7/2015 |
| EP | 2893685 A | 7/2015 |
| JP | 2015-529366 A | 10/2015 |
| JP | 2015-529367 A | 10/2015 |
| WO | 2009/018584 A1 | 2/2009 |
| WO | 2010149222 | 12/2010 |
| WO | 2010151273 | 12/2010 |
| WO | 2012070993 | 5/2012 |
| WO | 2014039772 | 3/2014 |
| WO | 2014039882 | 3/2014 |
| WO | 2014039918 | 3/2014 |
| WO | 2014039919 | 3/2014 |
| WO | 2014039921 | 3/2014 |
| WO | 2015191119 | 12/2015 |

OTHER PUBLICATIONS

Haslam, Simon. 'Virtualisation arrives for Exalogic 2—Details from Launch Event'. Jul. 26, 2012 [retrieved on Jun. 2, 2015]. Retrieved from the Internet <URL: http://www.veriton.co.uk/roller/fmw/entry/exalogic_2_details_from_launch>.*

Non-Final Office Action mailed on Aug. 28, 2014 in U.S. Appl. No. 13/838,113, 14 pages.

Non-Final Office Action mailed on Sep. 11, 2014 in U.S. Appl. No. 13/838,537, 22 pages.

Written Opinion mailed on Sep. 11, 2014 in International Application. No. PCT/US2013/058642, 8 pages.

An Introduction to Role-Based Access Control, NIST/ITL Bulletin, retrieved from the Internet: URL: http://csrc.nist.gov/groups/SNS/rbac/documents/design_implementation/Intro_role_based_access.htm on Oct. 22, 2013, Dec. 1995, 5 pages.

Basic Traversals, The Neo4J Manual, Neo Technology, Inc. (copyright 2012), 7 Pages.

LDAP Authentication Overview, Juniper Networks, Inc. (copyright 1999-2010), 4 pages.

Oracle Internet Directory Administrator's Guide: Introduction to LDAP and Oracle Internet Directory, Oracle, 10g Release 2, B14082-02, retrieved from the Internet: URL: http://docs.oracle.com/cd/B14099_19/idmanage.1012/b14082/intro.htm on Oct. 1, 2013, 1999, 9 pages.

Using ldapsearch, *Red Hat Directory Server 8.2 Administration Guide for managing Directory Server instances Edition 8.2.8*, Red Hat, Inc. (copyright), 2 pages.

XACML v3.0 Heirarchical Resource Profile Version 1.0, Oasis, Working Draft 7, retrieved from the Internat: URL: http://xml.coverpages.org/XACML-v30-HierarchicalResource Profile-WD7.pdf on Aug. 29, 2013., Apr. 1, 2009, 22 pages.

Afgan et al., CloudMan as a Tool Execution Framework for the Cloud, IEEE Proceedings of the 35th International Convention on Information and Communication Technology, Electronics and Microelectronics (MIPRO 2012), pp. 437-441.

Anthony et al., Consolidation Best Practices: Oracle Database 12c plugs you into the cloud, Oracle White Paper, retrieved from the Internet: URL: http://www.oracle.com/us/products/database/database-private-cloud-wp-360048.pdf on Oct. 1, 2013, Jul. 2013, 30 pages.

Bastos et al., Towards a Cloud-Based Environment for Space Systems Concept Design, IEEE International Conference on Informational Society (I-Society 2012), pp. 478-483.

Bierman et al., Network Configuration Protocol (NETCONF) Access Control Model, Internet Engineering Task Force, RFC 6536, retrieved from the Internet:.URL: http://tools.ietf.org/html/rfc6536 on Aug. 29, 2013, Mar. 2012, 50 pages.

Chanliau et al., Oracle Fusion Middleware: Oracle Platform Security Services (OPSS) FAQ, Oracle Corporation, retrieved from the Internet: URL: http://www.oracle.com/technetwork/testcontent/opss-faq-131489.pdf on Oct. 1, 2013, Jul. 2010, 6 pages.

Chiba et al., Dynamic Authorization Extension to Remote Authentication Dial in User Service (RADIUS), Network Working Group, RFC 5176, retrieved from the Internet: URL: http://tools.ietf.org/html/rfc5176 on Aug. 29, 2013, Jan. 2008, 35 pages.

Clemm et al., Web Distributed Authoring and Versioning (WebDAV) Access Control Protocol, Network Working Group,

(56) References Cited

OTHER PUBLICATIONS

RFC 3744, retrieved from the Internet: URL: http://www.ietf.org/rfc/rfc3744.txt on Aug. 29, 2013, May 2004, 66 pages.
Datta et al., Oracle Fusion Middleware Developer's Guide for Oracle Identity Manager, Oracle Corporation, 11g Release 2, E27150-08, retrieved from the Internet: URL: http://docs.oracle.com/cd/E37115_01/dev.1112/e27150/toc.htm on Oct. 1, 2013, Sep. 2013, 1102 pages.
Demarest et al., Oracle Cloud Computing, An Oracle White Paper, Oracle Corporation, Redwood Shores, CA, May 2010, 22 pages.
Hunter, LDAP Searching—Setting the SCOPE Parameters, available at http://www.idevelopment.info/data/LDAP/LDAP_Resources/SEARCH_Setting_the_SCOPE_Parameter.shtml, (copyright 1998-2013), 2 pages.
Paul et al., Architectures for the future networks and the next generation Internet: A survey, Computer Communications 34: 2-42 (2011).
International Patent Application No. PCT/US2013/058426, International Search Report and Written Opinion mailed on Nov. 8, 2013, 9 pages.
International Patent Application No. PCT/US2013/058596, International Search Report and Written opinion mailed on Nov. 22, 2013, 9 pages.
International Patent Application No. PCT/US2013/058638, International Search Report and Written Opinion mailed on Jan. 8, 2014, 11 pages.
International Patent Application No. PCT/US2013/058639, International Search Report and Written Opinion mailed on Jan. 8, 2014, 10 pages.
International Patent Application No. PCT/US2013/058642, International Search Report & Written Opinion mailed on Feb. 7, 2014, 17 pages.
Subi et al., Oracle Fusion Middleware Application Security Guide, Oracle Corporation, 11g Release 1, E10043-09, retrieved from the Internet: URL: http://docs.oracle.com/cd/E21764_01/core.1111/e10043/undegps.htm on Oct. 1, 2013, May 2011, 834 pages.
Teger et al., Oracle Fusion Middleware Developer's Guide for Oracle Access Management, Oracle Corporation, 11g Release 2, E27134-06, retrieved from the Internet: URL: http://docs.oracle.com/cd/E37115_01/dev.1112/e27134/toc.htm on Oct. 1, 2013, Jul. 2013, 372 pages.
Teger, Oracle Fusion Middleware Developer's Guide for Oracle Entitlements Server, Oracle Corporation, 11g Release 1, E27154-01, retrieved from the Internet: URL: http://docs.oracle.com/cd/E27559_01/dev.1112/e27154/handle_auth_calls.htm on Oct. 1, 2013, Jul. 2012, 132 pages.
U.S. Appl. No. 13/842,269, Non Final Office Action mailed on Jun. 5, 2014, 12 pages.
U.S. Appl. No. 13/838,813, Non Final Office Action mailed on Aug. 14, 2014, 22 pages.
International Application No. PCT/US2013/058642, Invitation to restrict or pay additional fees mailed on Jul. 23, 2014, 3 pages.
International Patent Application No. PCT/US2013/058426, Written Opinion, mailed Aug. 19, 2014, 7 pages.
International Patent Application No. PCT/US2013/058596, Written Opinion, mailed Aug. 19, 2014, 6 pages.
U.S. Appl. No. 13/907,689, Non-Final Office Action mailed on Jan. 7, 2015, 11 pages.
Oracle—Breaking Cloud Security Barriers with Identity Management, Oracle, 2010, 37 pages.
Oracle Identity Management 11 g—An Oracle Whitepaper, Oracle, Jul. 2010, 61 pages.
Alcaraz Calero, Jose M. et al., "Toward a Multi-Tenancy Authorization System for Cloud Services", IEEE Computer and Realibily Societies, Nov./Dec. 2010, pp. 48-55.
Tsai, Wei-Tek et al., "Role-Based Access Control Using Reference Ontology in Clouds", IEEE, 2011 Tenth International Symposium on Autonomous Decentralized Systems, 2011, pp. 121-128.
Wainwright, Steve, "Oracle Public Cloud—An Enterprise Cloud for Business Critical Applications", Oracle, 2011, 39 pages.
Oracle Unveils Oracle Public Cloud, Oracle, Oct. 5, 2011, 2 pages.
Lau, Christina et al., "Best Practices for access control in multi-tenant cloud solutions using Tivoli Access Manager", IBM, DeveloperWorks, May 1, 2011, 8 pages.
Rashee, Haroon et al., "Multi-Tenancy on Private Cloud", Enlighten, Feb. 2012, 20 pages.
The Oracle Identity Management Platform: Identity Services at Internet Scale, Oracle, Jul. 2012, 20 pages.
U.S. Appl. No. 13/842,269, Notice of Allowance mailed on Nov. 3, 2014, 8 pages.
U.S. Appl. No. 14/019,051, Non-Final Office Action mailed on Nov. 20, 2014, 5 pages.
U.S. Appl. No. 13/838,813, Final Office Action mailed on Dec. 4, 2014, 24 pages.
U.S. Appl. No. 13/842,833, Notice of Allowance mailed on Dec. 15, 2014, 11 pages.
U.S. Appl. No. 13/840,943, Non-Final Office Action mailed on Dec. 18, 2014, 10 pages.
U.S. Appl. No. 13/843,613, Non-Final Office Action mailed on Jan. 23, 2015, 17 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
International Application No. PCT/US2013/058638, International Preliminary Report on Patentability mailed on Jun. 12, 2015, 8 pages.
U.S. Appl. No. 13/907,728, Non-Final Office Action mailed on Jul. 2, 2015, 14 pages.
U.S. Appl. No. 13/907,689, Non-Final Office Action mailed on Sep. 16, 2015, 17 pages.
Notice of Allowance issued Jun. 29, 2015 in U.S. Appl. No. 13/840,943, 13 pages.
Notice of Allowance issued Jul. 7, 2015 in U.S. Appl. No. 13/835,307, 11 pages.
Final Office Action mailed Jul. 21, 2015 in U.S. Appl. No. 13/838,813, 22 pages.
Non-Final Office Action mailed Feb. 18, 2015 in U.S. Appl. No. 13/835,307, 12 pages.
Written Opinion mailed Apr. 22, 2015 in International Patent Application No. PCT/US2013/058638, 7 pages.
Final Office Action mailed May 21, 2015 in U.S. Appl. No. 13/907,689, 12 pages.
Non-Final Office Action mailed Jun. 19, 2015 in U.S. Appl. No. 13/836,625, 41 pages.
Koved et al., Access Rights Analysis for Java, Proceedings of the 17th ACM SIGPLAN conference on Object-oriented programming, systems, languages, and applications, 2002, pp. 359-372.
Kagal et al., A Policy Language for a Pervasive Computing Environment, Proceedings of the 4th IEEE International Workshop on Policies for Distributed Systems and Networks, 2003, pp. 63-74.
Emig et al., An Access Control Metamodel for Web Service-Oriented Architecture, IEEE, 2007, pp. 1-8.
Jahid et al., MyABDAC: Compiling XACML Policies for Attribute-Based Database Access Control, ACM, Feb. 23, 2011, pp. 97-108.
Notice of Allowance mailed Feb. 4, 2015 in U.S. Appl. No. 13/838,537, 19 pages.
Notice of Allowance mailed Feb. 23, 2015 in U.S. Appl. No. 13/838,113, 15 pages.
Non-Final Office Action mailed Mar. 12, 2015 in U.S. Appl. No. 13/838,813, 21 pages.
Oracle, Identity Manager Design Console Guide, Release 9.1.0, Jun. 2008, 208 pages.
Buyya, Cloud Computing Principles and Paradigms, 2011, 674 pages.
Chong et al., ISVs are from Mars, and Hosters are from Venus, https://msdn.microsoft.com/en-us/library/bb891759.aspx, Nov. 2007, 28 pages.
Dan et al., Web services on demand: WSLA-driven automated management, IBM Systems Journal Volume: 43 Issue: 1, 2004, pp. 136-158.

(56) References Cited

OTHER PUBLICATIONS

Keahey et al., Virtual Workspaces for Scientific Applications, 2007, pp. 1-5.
International Application No. PCT/US2013/058639, International Preliminary Report on Patentability mailed on Sep. 24, 2015, 8 pages.
International Application No. PCT/US2013/058639, Written Opinion mailed on Jul. 7, 2015, 6 pages.
International Application No. PCT/US2013/058642, International Preliminary Report on Patentability mailed on Jan. 20, 2015, 10 pages.
International Application No. PCT/US2015/016214, International Search Report and Written Opinion mailed on May 11, 2015, 11 pages.
U.S. Appl. No. 13/907,689, Advisory Action mailed on Aug. 12, 2015, 2 pages.
U.S. Appl. No. 13/907,616, Non-Final Office Action mailed on Dec. 4, 2015, 9 pages.
U.S. Appl. No. 13/907,728, Final Office Action mailed on Dec. 17, 2015, 16 pages.
U.S. Appl. No. 13/836,625, Final Office Action mailed on Jan. 13, 2016, 46 pages.
EP Patent Application No. 13766777.0, Office Action mailed on Feb. 10, 2016, 5 pages.
U.S. Appl. No. 13/907,689, Notice of Allowance mailed Apr. 22, 2016, 8 pages.
U.S. Appl. No. 14/877,835, Non-Final Office Action mailed Jun. 17, 2016, 12 pages.
U.S. Appl. No. 13/907,616, Final Office Action mailed Jun. 28, 2016, 9 pages.
International Patent Application No. PCT/US2015/016214, Written Opinion mailed Jun. 3, 2016, 5 pages.
International Application No. PCT/US2015/016214, International Preliminary Report on Patentability mailed on Sep. 19, 2016, 44 pages.
U.S. Appl. No. 14/624,356, Non-Final Office Action mailed on Sep. 15, 2016, 9 pages.
U.S. Appl. No. 13/907,728, Notice of Allowance mailed on Aug. 25, 2016, 13 pages.

* cited by examiner

SEPARATION OF POD PROVISIONING AND SERVICE PROVISIONING

CROSS-REFERENCES TO RELATED APPLICATIONS

The present application is a non-provisional of and claims the benefit and priority under 35 U.S.C. 119(e) of the following applications, the entire contents of which are incorporated herein by reference for all purposes:
(1) U.S. Provisional Application No. 61/698,413, filed Sep. 7, 2012, entitled TENANT AUTOMATION SYSTEM;
(2) U.S. Provisional Application No. 61/698,459, filed Sep. 7, 2012, entitled SERVICE DEVELOPMENT INFRA-STRUCTURE;
U.S. Provisional Application No. 61/785,299, filed Mar. 14, 2013, entitled CLOUD INFRASTRUCTURE;
(4) U.S. Provisional Application No. 61/801,160, filed Mar. 15, 2013, entitled SEPARATION OF POD PROVISIONING AND SERVICE PROVISIONING; and
(5) U.S. Provisional Application No. 61/794,427, filed Mar. 15, 2013, entitled CLOUD INFRASTRUCTURE.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

SUMMARY

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to some embodiments, a method for POD provisioning and service provisioning is disclosed. The method may comprise storing, by a cloud infrastructure system, subscription order information from a customer identifying a service from a set of cloud services provided by the cloud infrastructure system, the cloud infrastructure system comprising one or more computing devices, wherein the subscription order information includes customer-specific configuration. Additionally, the method may comprise determining, by a computing device from the one or more computing devices, a service associated with the subscription order information. Moreover, the method may comprise mapping a pre-provisioned anonymous deployment to the subscription order information, wherein the pre-provisioned anonymous deployment is specifically pre-provisioned for the determined service. Furthermore, the method may comprise creating, by a computing device from the one or more computing devices, a service instance specifically for the customer by configuring the pre-provisioned anonymous deployment with the customer-specific configuration.

According to another embodiment, a system comprising: one or more computing device configurable to offer a set of cloud services; a memory configurable to store subscription order information from a customer identifying a service from a set of cloud services, wherein the subscription order information includes customer-specific configuration; and wherein a computing device from the one or more computing devices is configurable to: determine a service associated with the subscription order information; map a pre-provisioned anonymous deployment to the subscription order information, wherein the pre-provisioned anonymous deployment is specifically pre-provisioned for the determined service; and create a service instance specifically for the customer by configuring the pre-provisioned anonymous deployment with the customer-specific configuration.

According to another embodiment, one or more computer-readable media storing computer-executable instructions for a cloud infrastructure system configured to offer a set of cloud services that, when executed, cause one or more computing devices in the cloud infrastructure system to: store subscription order information from a customer identifying a service from a set of cloud services, wherein the subscription order information includes customer-specific configuration; determine a service associated with the subscription order information; map a pre-provisioned anonymous deployment to the subscription order information, wherein the pre-provisioned anonymous deployment is specifically pre-provisioned for the determined service; and create a service instance specifically for the customer by configuring the pre-provisioned anonymous deployment with the customer-specific configuration.

BRIEF DESCRIPTION OF THE DRAWINGS

Illustrative embodiments of the present invention are described in detail below with reference to the following drawing figures.

DETAILED DESCRIPTION

Figure 1A:
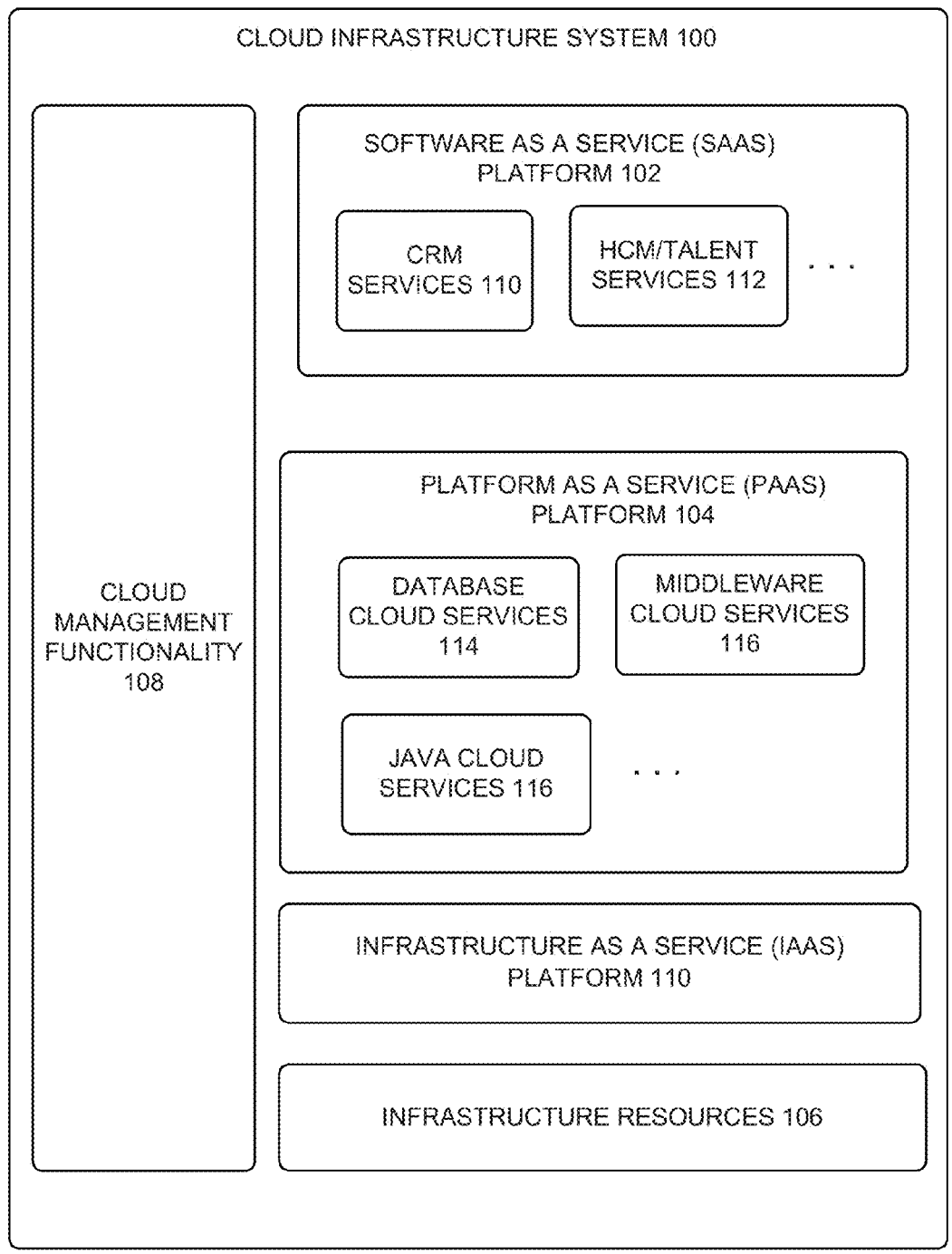
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
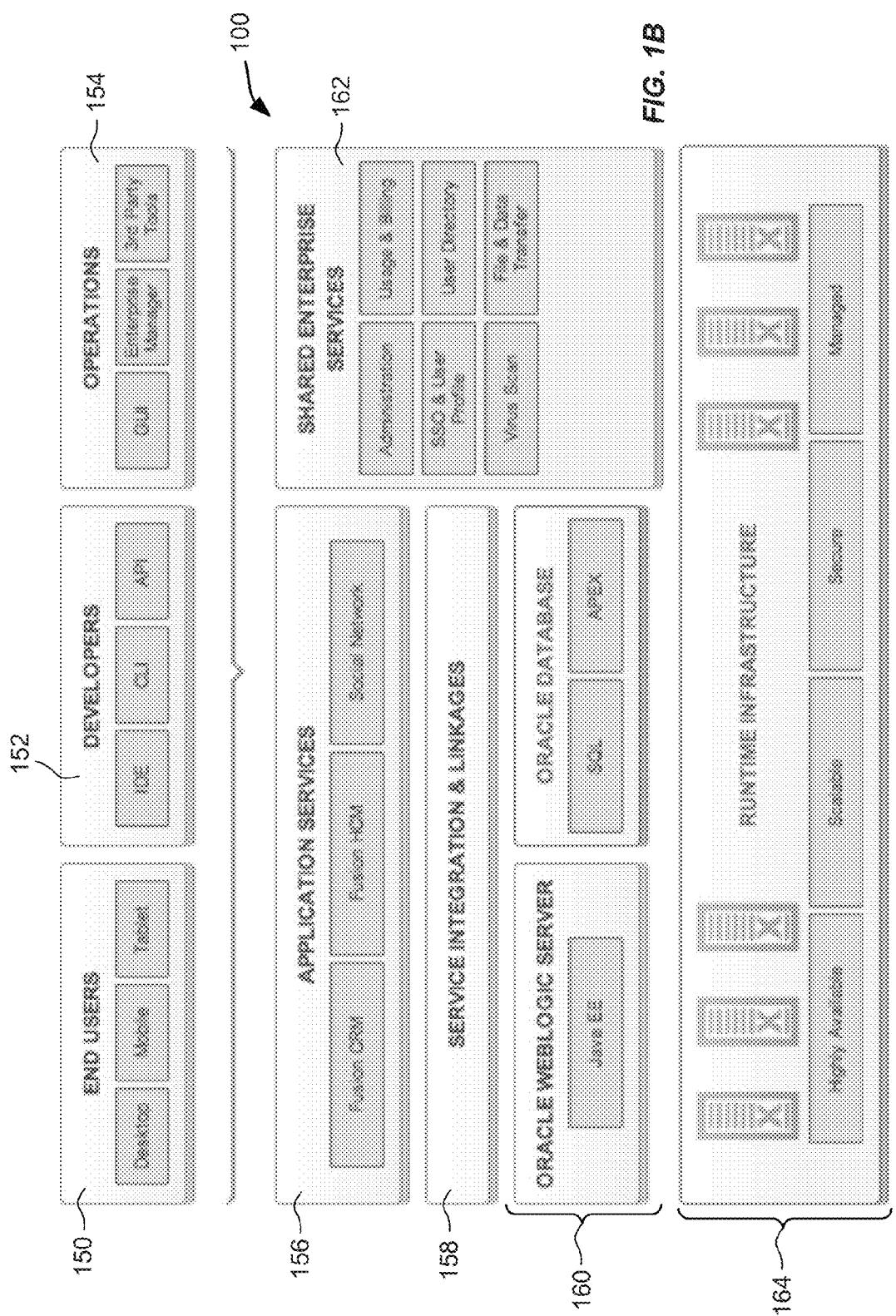
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
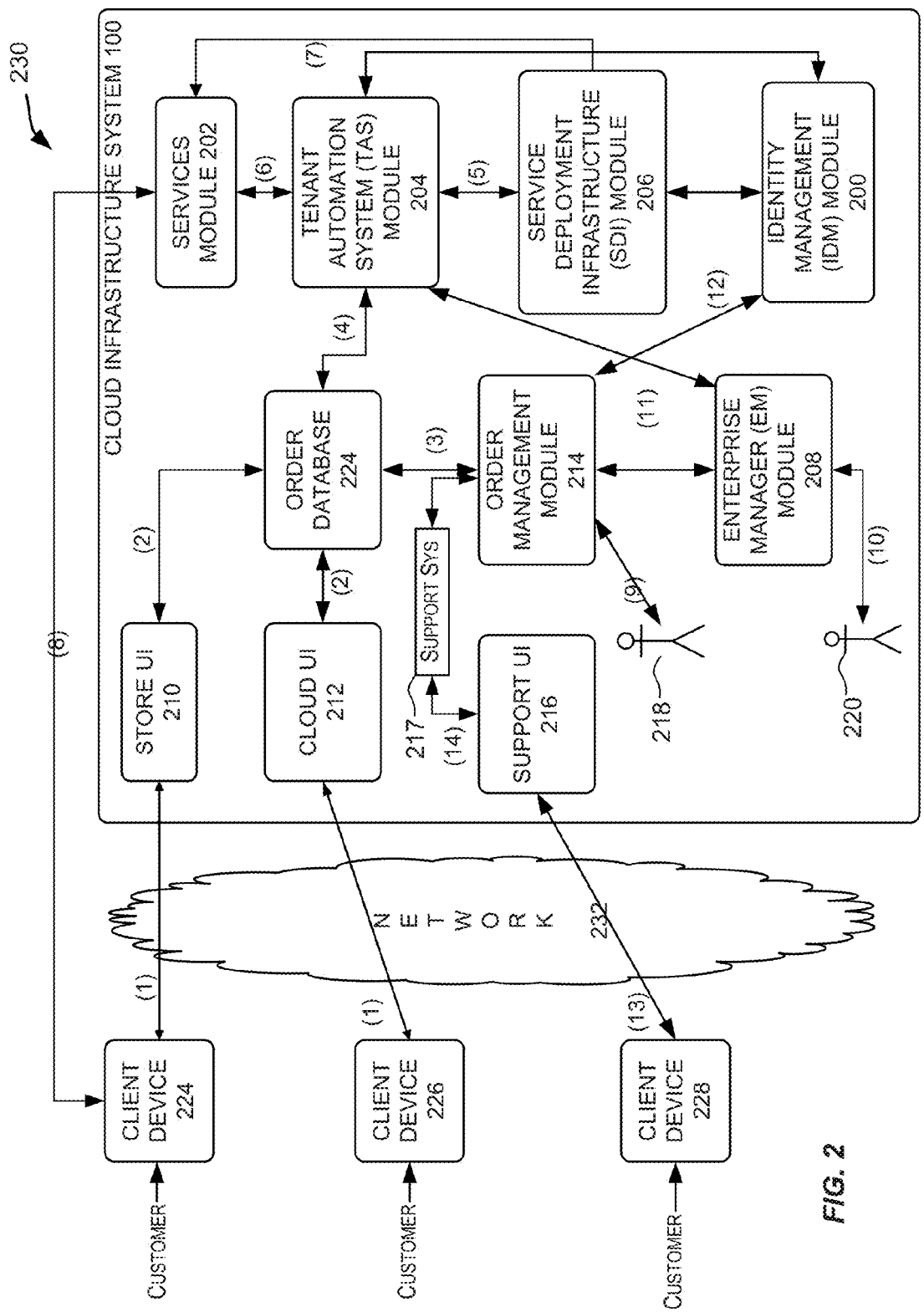
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
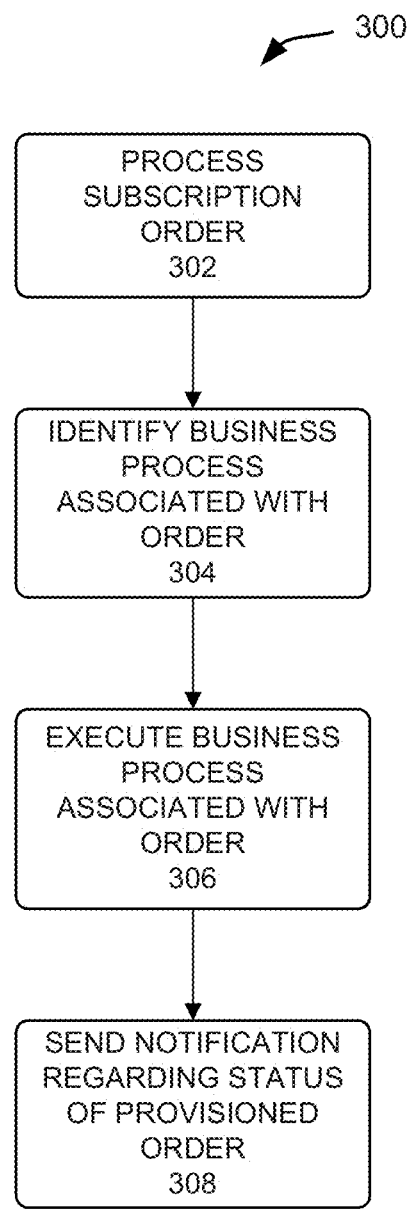
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
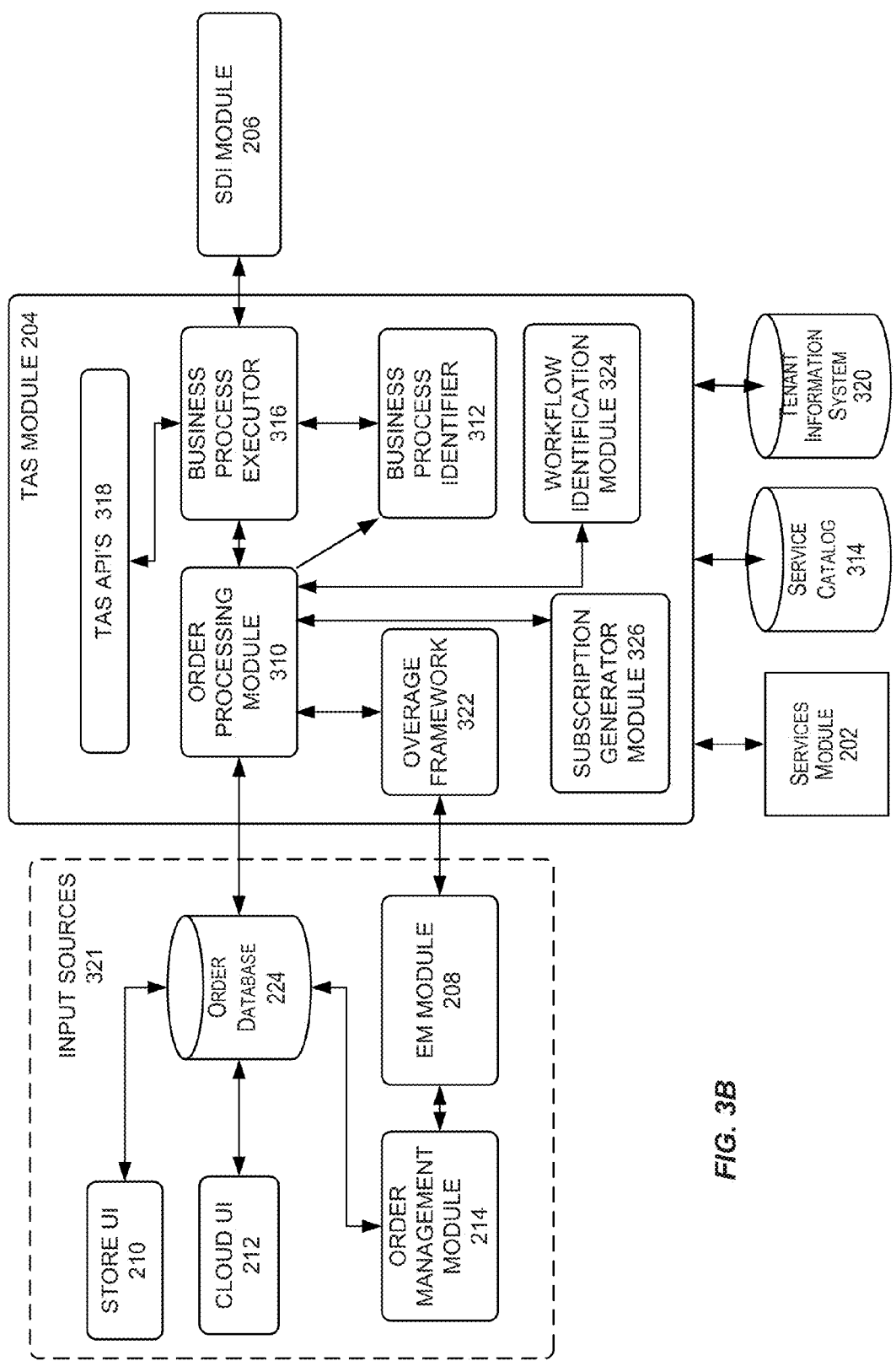
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
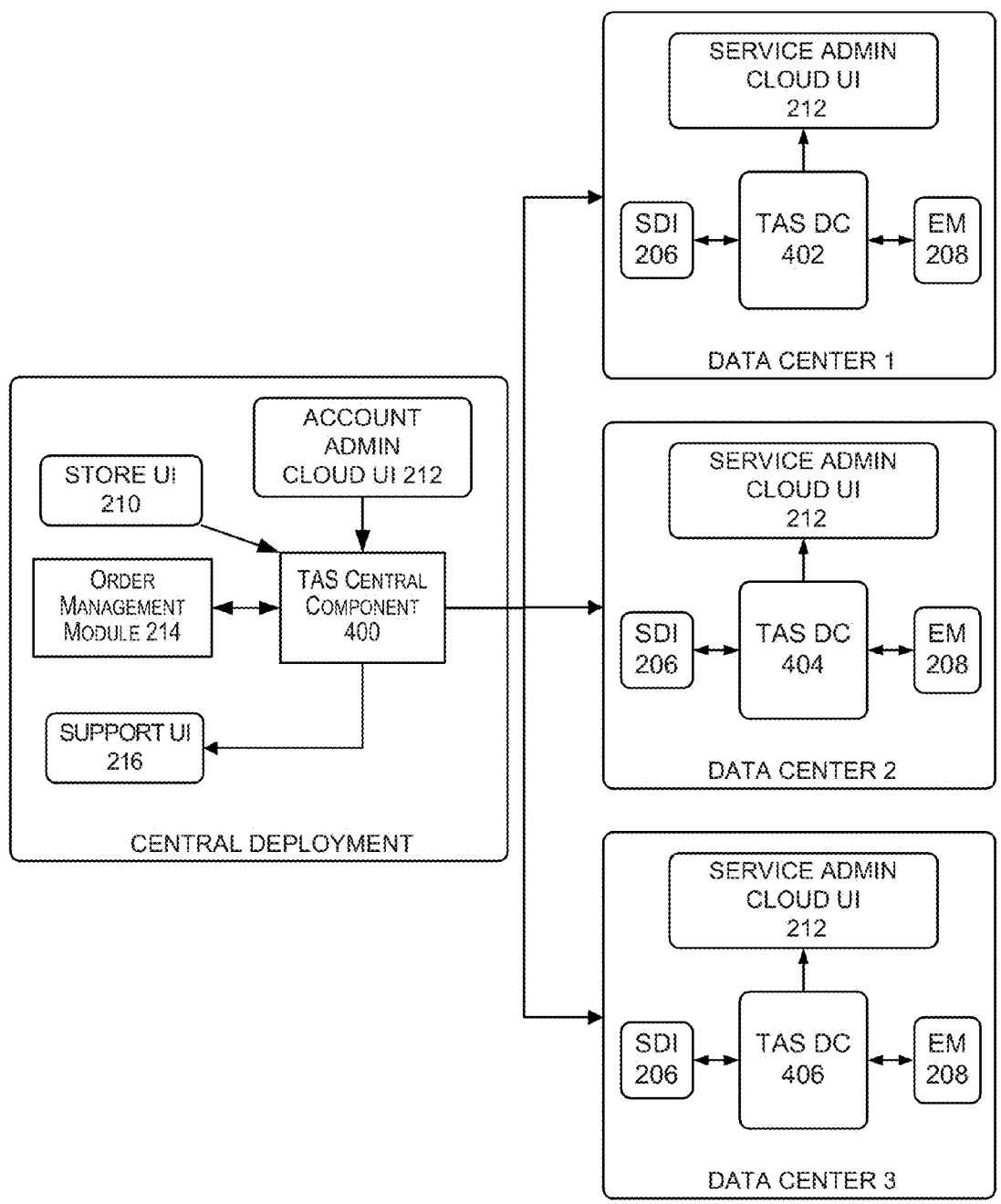
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
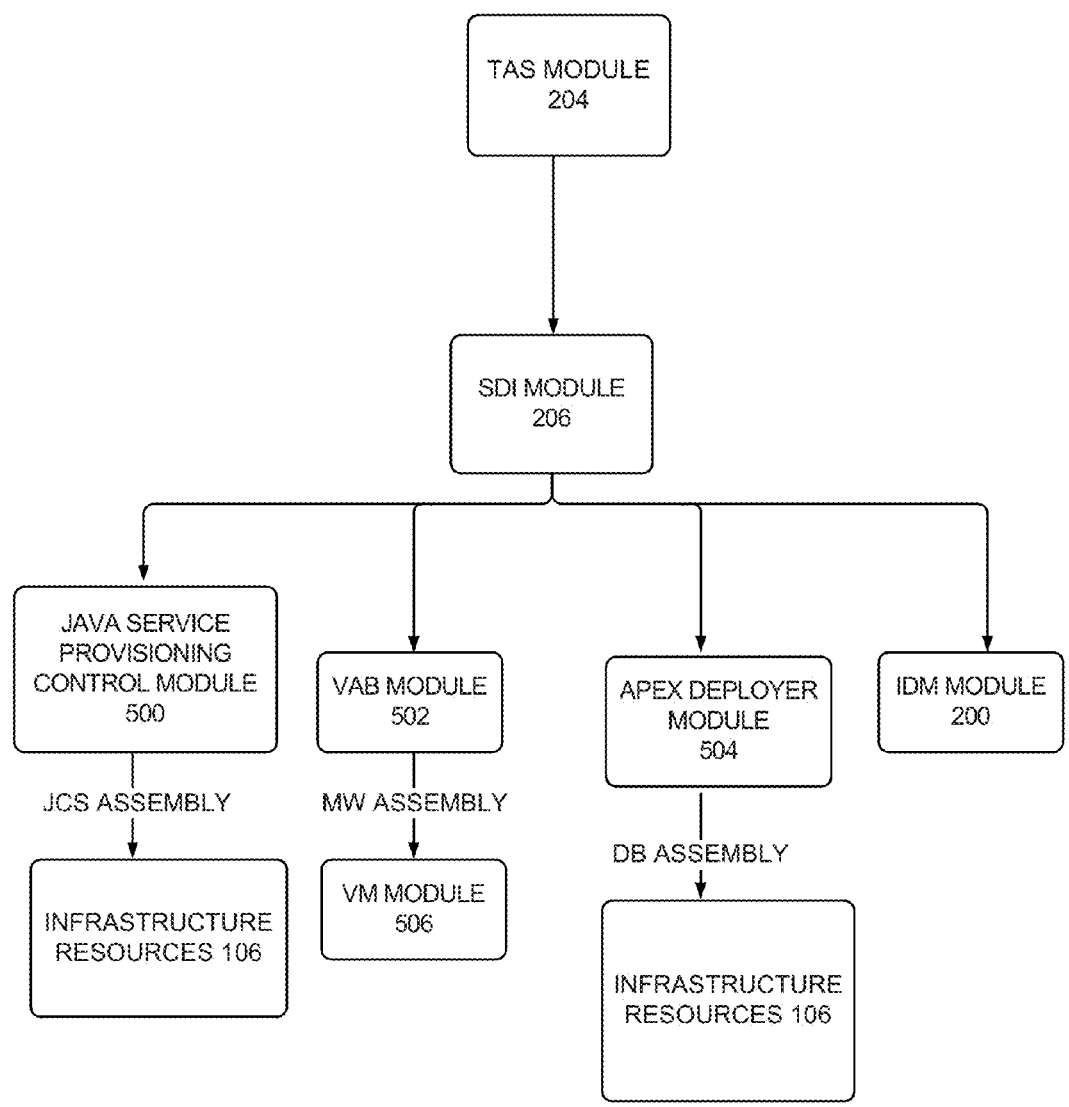
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
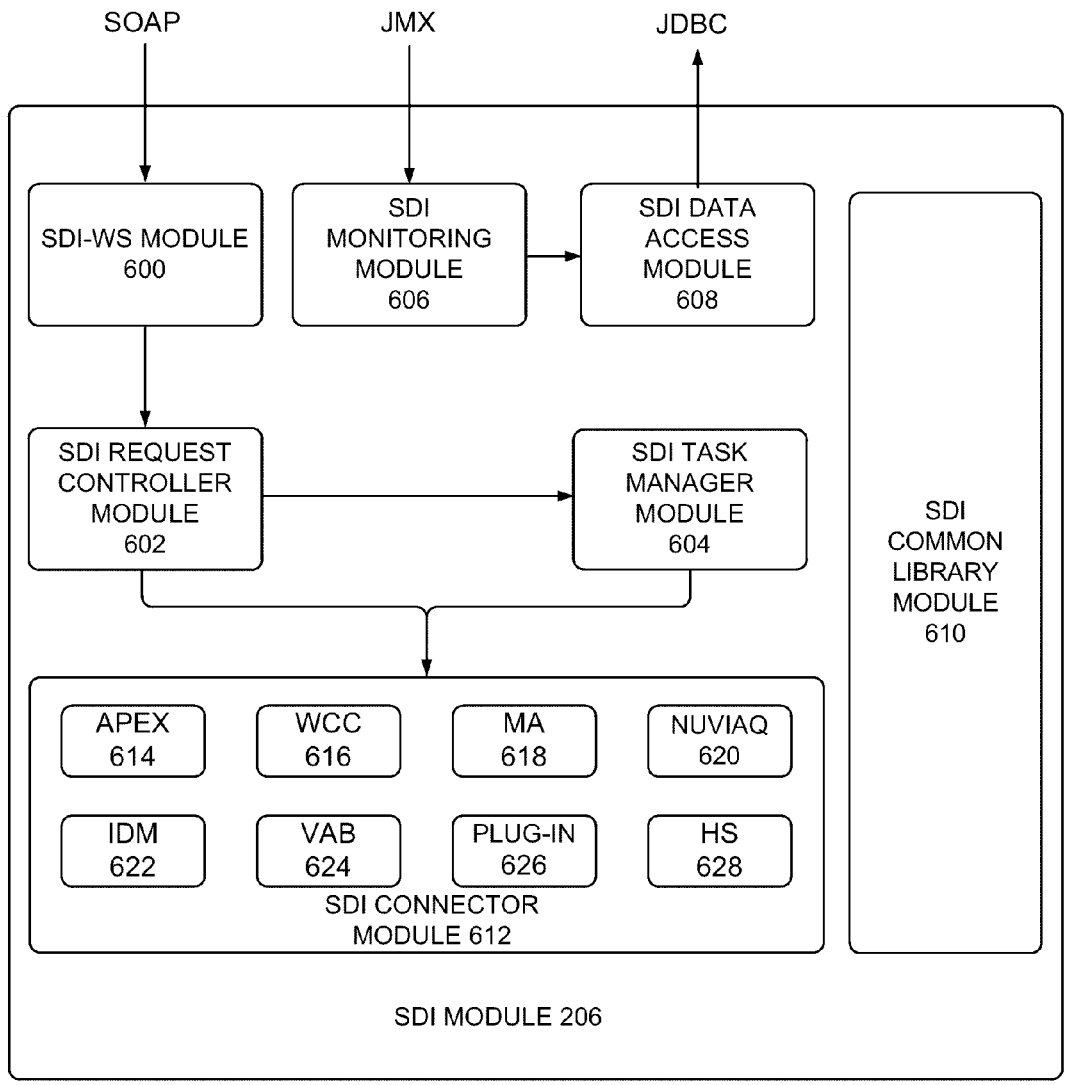
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
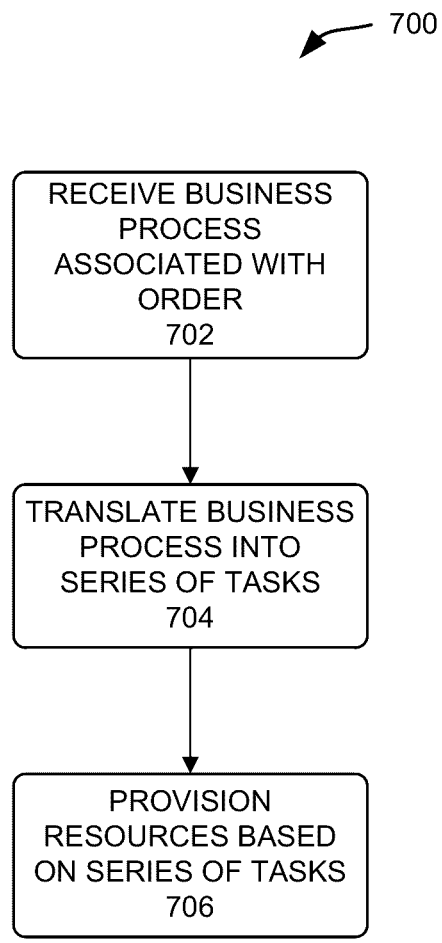
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
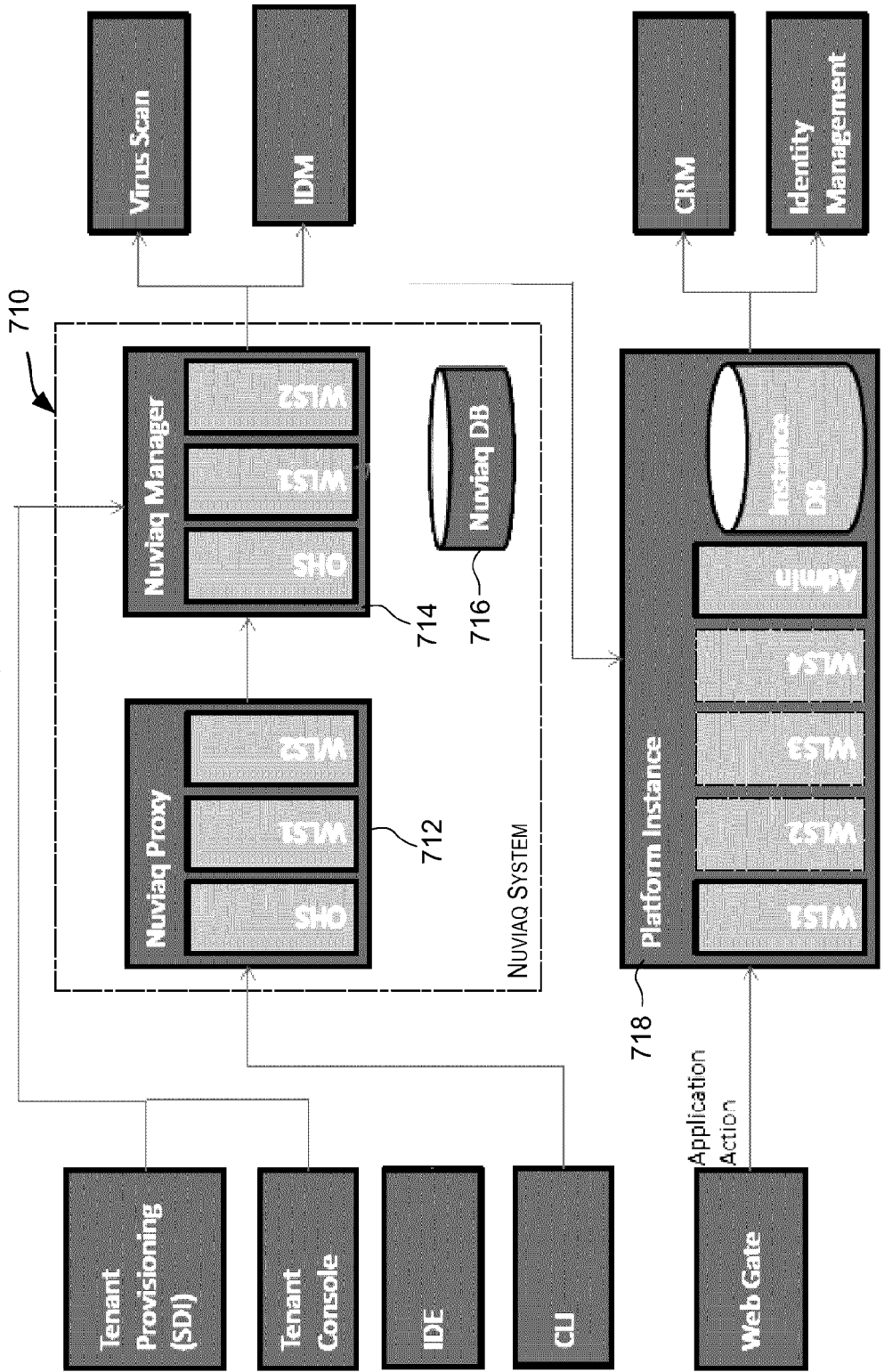
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent requests related to this instance. A Platform Deployment descriptor provided to the Create Platform Instance action allows for properties to be set that modify the configuration of the platform instance to meet the subscription requirements of the tenant. These properties may include for example:
Property#1: oracle.cloud.service.weblogic.size
   Values: BASIC, STANDARD, ENTERPRISE
   Description: Specifies the subscription type. This impacts the number of servers, database limits and quality of service settings.
Property#2: oracle.cloud.service.weblogic.trial
   Values: TRUE, FALSE
   Description: Indicates whether or not this is a trial subscription.
Property#3: oracle.cloud.service.weblogic.crm
   Values: CRM Service ID
   Description: Identifies a CRM service to be associated with this WebLogic service instance.

Figure 7C:
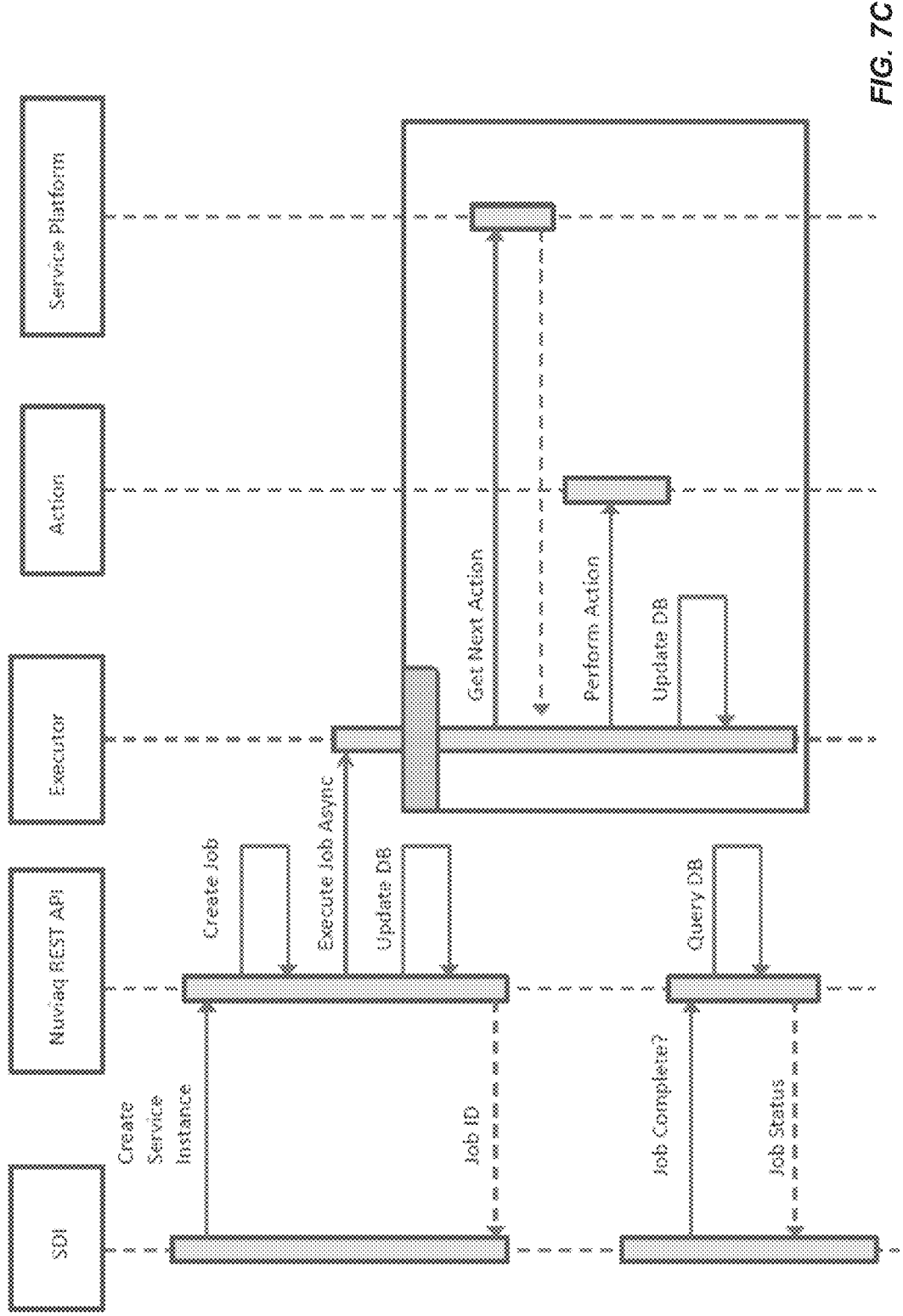
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:
Property: oracle.cloud.service.weblogic.state
Values: RUNNING, STOPPED
Description: Specifies the initial state of the application after deployment.

Figure 7D:
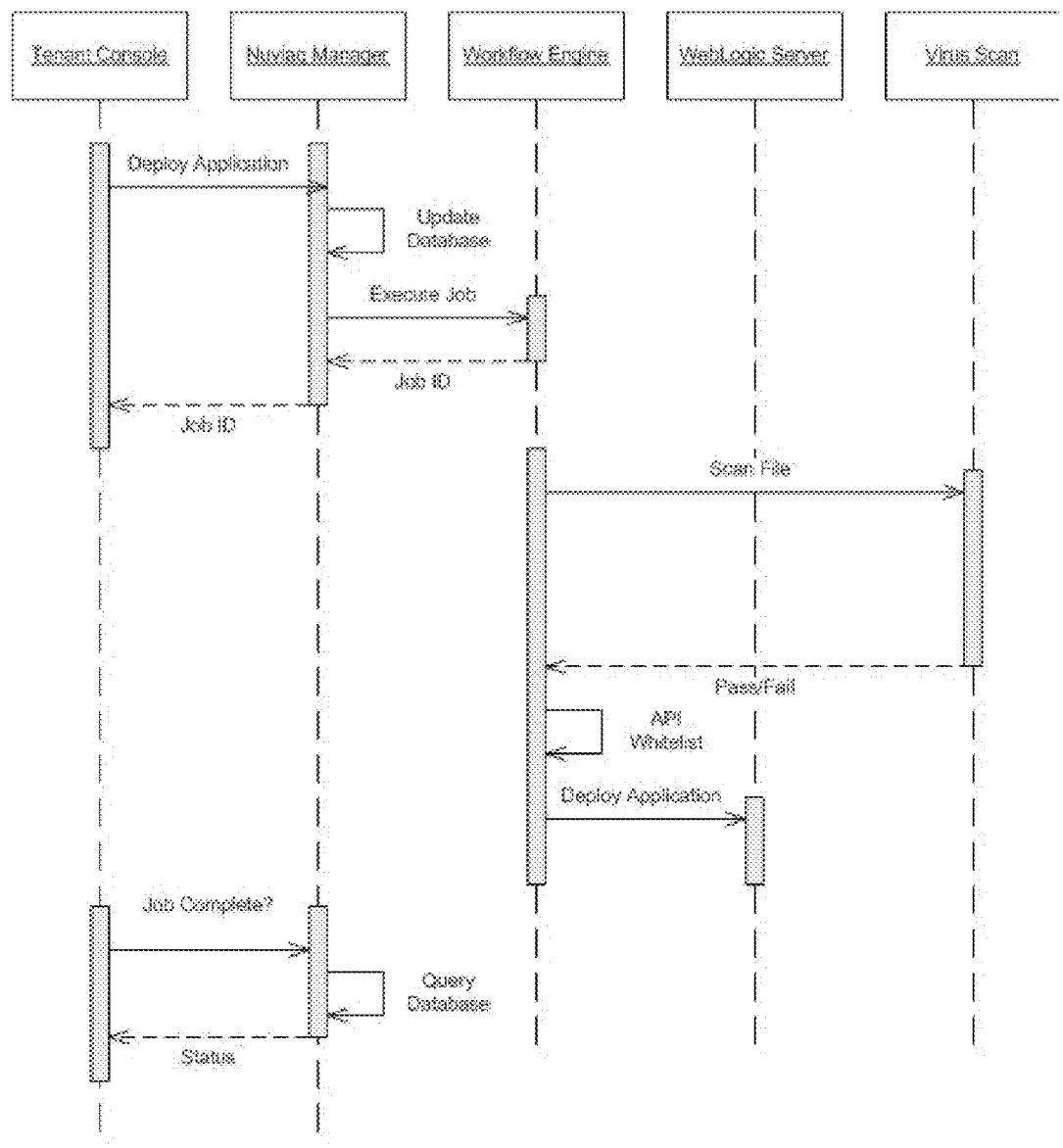
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:
(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
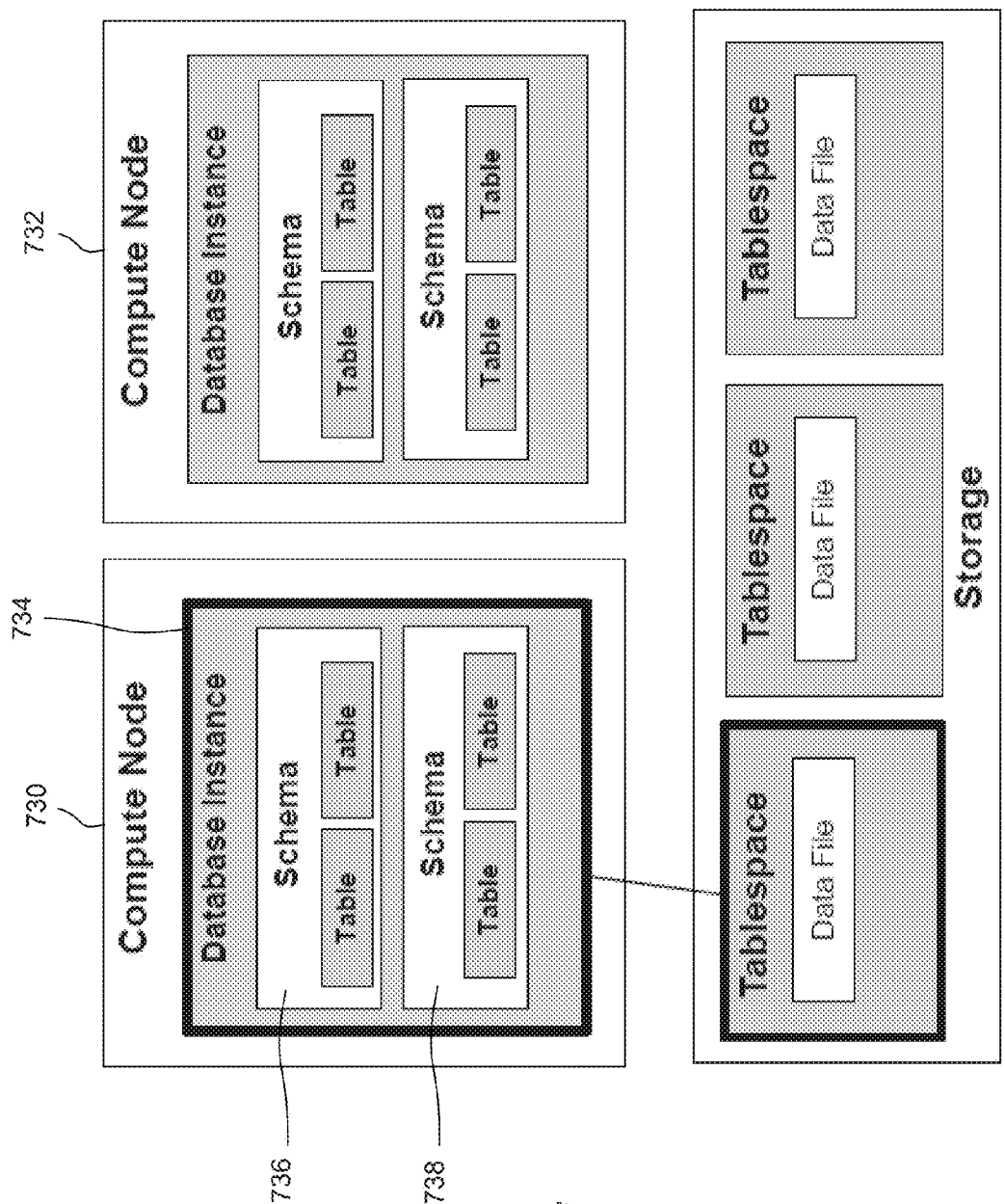
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

POD Provisioning and Service Provisioning

According to some embodiments, SDI can coordinate separate POD provisioning and service provisioning for services. A POD is a logical entity that can represent one of the following: a pre-provisioned anonymous single-tenant deployment (as is the case for the Java service); or a multi-tenant stack (physical or virtualized) that serves multiple tenants (as is the case for the database service). For example, a POD is a deployment of a service on a physical stack. A POD can house one or more service instances. PODs can be created a priori or can be created on-demand when a service instance is created for a given customer.

In some instances, a POD is an instantiation of a software stack for running a service. A POD is thus used to run a service. For example, a POD corresponding to Java service may comprise a stack of virtual machines. As another example, a POD for a database service may comprise an instance of a database. A POD may be considered as a subsystem that is capable of hosting a service. Different pods may be used for different services.

The task of creating a POD for a service is referred to as POD provisioning. As it will be illustrated in FIG. 8B, POD provisioning can facilitated by SDI module 206. POD provisioning is the act of creating an anonymous instance of the software component. A POD can be fully installed and wired from an infrastructure point of view. A POD does not have customer specific configuration data or integration (e.g., not connected to any customer stripe in LDAP).

The physical POD provisioning may contain three broad aspects:
1. POD definition schema to define the physical footprint of a Service
2. Service definition schema to capture service specific plug-ins and
3. Service configuration schema to capture Entreprise Management (EM), Identity Management (IDM), Uniform Resource Locator (URL) routing and other service specific configuration A different POD may be created for each service. For example, for Java service, a POD may map to a set of VMs running middleware technology (e.g., running Fusion middleware). Different automated flows may be used by SDI module 206 for POD provisioning. In some instances, a POD can also be an almost entirely virtual concept.

An example of a POD can include a set of data center resources that have been wired together to provide a particular service for a particular customer. A POD can include a dedicated resource in shared infrastructure. For example, in the case of services that are deployed using VAB technology such as Oracle Virtual Assembly Builder (OVAB) technology, the OVAB assembly is the POD. Another example of a POD can include the core set of VMs that makes up a Java assembly in a domain. For Fusion applications, the POD can be the set of virtual machines that are dedicated to that particular installation of fusion applications, which can include the database and the VMs. For the database service, a POD can include the Exadata along with the DB instances on the Exadata.

Figure 8A:
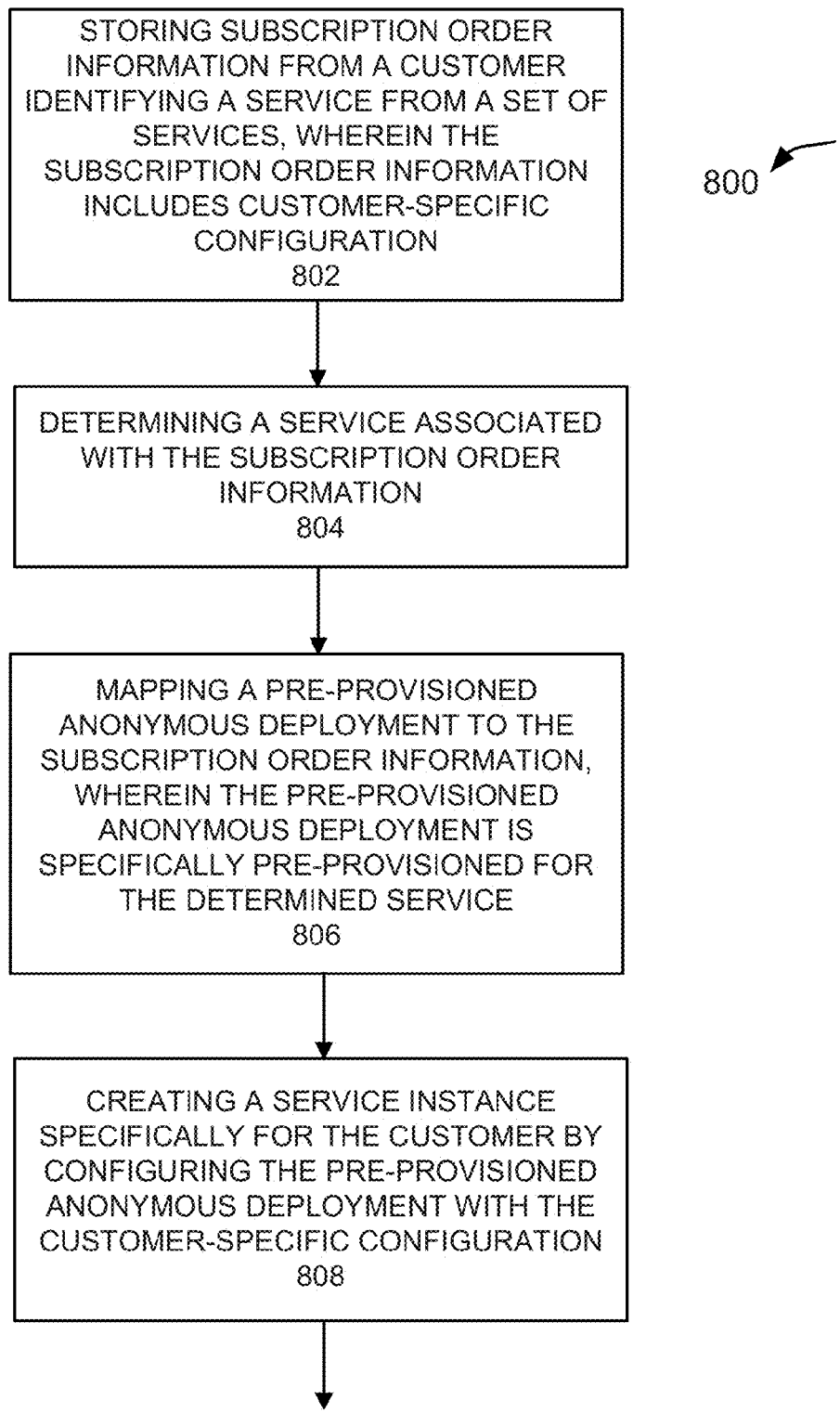
FIGS. 8A-B depict simplified flowcharts depicting processing that may be performed by SDI module in the cloud infrastructure system, in accordance with an embodiment of the present invention.

FIG. 8A depicts a simplified flowchart 800 depicting processing that may be performed by SDI module 206 in the cloud infrastructure system, in accordance with an embodiment of the present invention. The processing depicted in FIG. 8A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 8 is not intended to be limiting. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 8A may be performed by one or more modules in the SDI module 206 discussed in detail in FIG. 6.

Figure 8B:
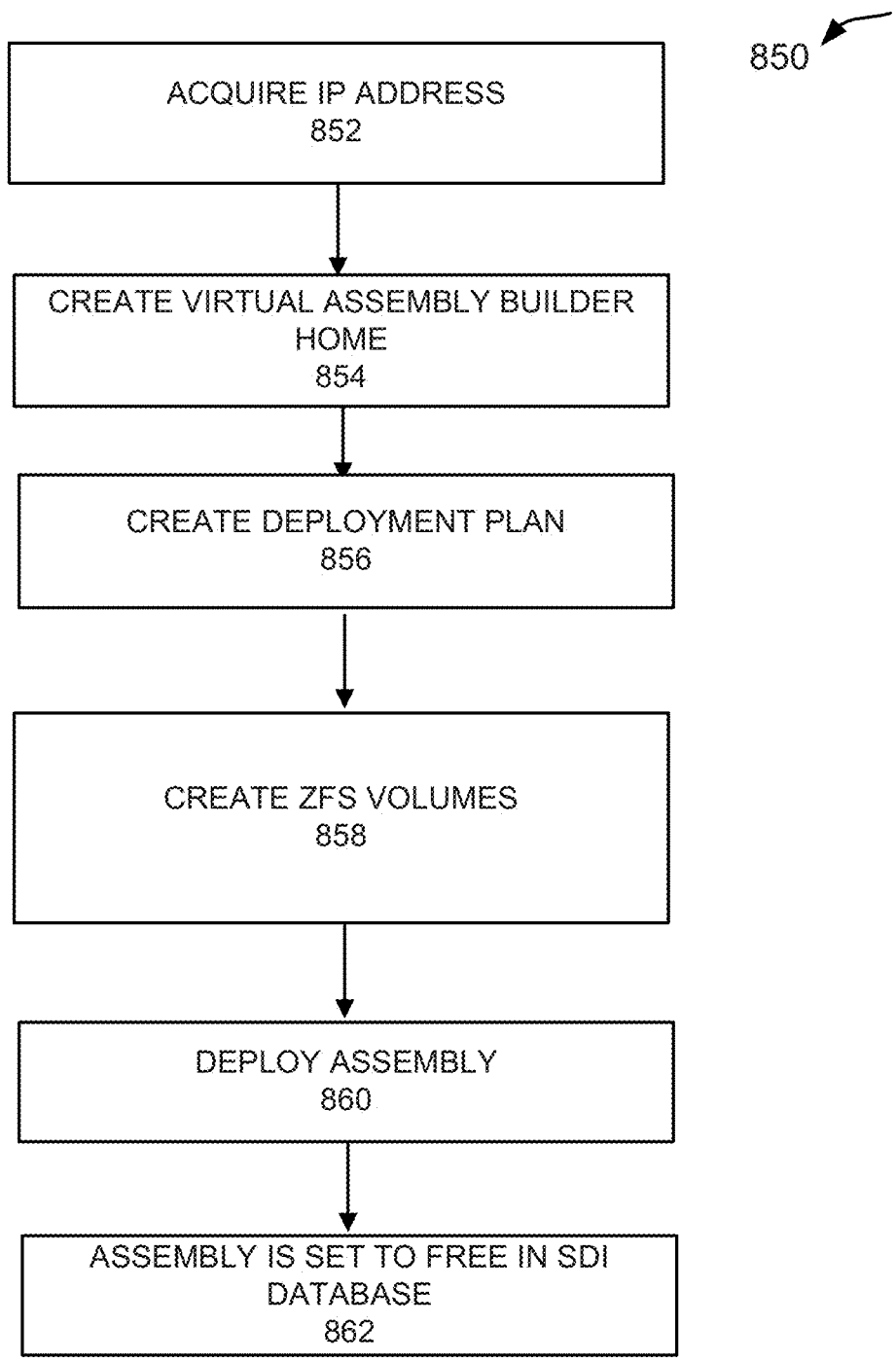

Flowchart 800 can be performed for each POD assembly that is pre-provisioned. SDI module 206 can use management algorithms and selection algorithms to provision the PODs in the background, and then determine a POD for a particular tenant when a request comes in. For example, as illustrated in FIG. 8B, SDI module 206 can pre-provision a POD before receiving a customer order. Once a service request is received, SDI module 206 can then add customer information to the POD and customize the POD based on the request, as illustrated in FIG. 8A.

At 802, SDI module 206 can store subscription order information from a customer identifying a service from a set of services. For example, the subscription order information can be a customer request from the store UI 210 for a database service. The subscription order information can include customer-specific configuration.

At 804, SDI module 206 can determine a service associated with the subscription order information. For example, SDI module 206 can determine that the customer order is for a database service. Therefore, when a customer order is received, SDI module 206 determines the type of service that has been requested in order to map a POD, which is service-specific, to the customer request.

At 806, SDI module 206 can map a pre-provisioned anonymous deployment to the subscription order information. The pre-provisioned anonymous deployment can be a POD. As discussed herein, a POD can be pre-provisioned and created for a specific service.

A service can map to the subscription of a particular customer. For example, a service can be the Java instance for a particular customer. A service instance is a particular subscription ID for a particular type of service, such as a Java service. A service instance can belong to a particular customer and lives on a pod. Only one service instance lives on a single-tenant POD, and multiple instances can live on a multiple-tenant POD. Furthermore, the service instance always lives in a POD and never spans two pods. On the other hand, the service instance may require more than just the POD to exist.

At 808, SDI module 206 can create a service instance specifically for the customer by configuring the pre-provisioned anonymous deployment with the customer specific configuration. For example, SDI module 206 can introduce customer-specific configuration into the POD using personality injection. Service provisioning is the process of binding a particular customer to a particular POD. This introduces customer-specific configuration into the POD (e.g., personality injection). A POD may support one or more tenants simultaneously (single or multi-tenant). In the case of a POD supporting multiple tenants, multiple personalities may be injected into the POD, one for each supported tenant.

According to another embodiment, a particular service can use multiple PODs. For example, a Java service can be requested. SDI module 206 can have pre-provisioned multiple Java PODs. Based on the requested size of the service, SDI module 206 can determine that multiple PODs are needed to support the requested service.

The processes of service provisioning and POD provisioning are separate and independent of each other and are coordinated by SDI module 206. This enables, for example, POD provisioning to be performed in the background. Spare pooling of pods may be based on administrator configurable options to anticipate future demand. Service provisioning is generally much faster than POD provisioning and happens on demand when SDI receives an order from TAS. SDI coordinates POD provisioning and service provisioning, while also handling the pooling and registration.

Pre-Provisioning PODs

According to some embodiments, fully-automated POD provisioning handled by SDI can create instance of the software component without a request from TAS. This can be a background activity run in advance of customer order. Standing up a POD can be slow, therefore POD Provisioning is done ahead of time, so when a customer orders a service, the customer can receive the order quickly (e.g., within seconds or minutes). A POD may support one or more tenants simultaneously (single or multi-tenant). The processes are independent such that POD provisioning can be performed in the background. Spare pooling of pods is based on administrator configurable options to anticipate future demand.

SDI module 206 can create new PODs if the resources become low. As later discussed, by using Min_Used thresholds, SDI module 206 can monitor usage and allocation. Based on the monitoring, SDI can pre-provision new PODs.

For example, when an SDI timer job runs and notifies SDI module 206 that number of free assemblies for a given service size (basic, standard, enterprise) has fallen below the Min_Used thresholds specified in the current configuration, additional assemblies can be pre-provisioned until the thresholds have been reached.

FIG. 8B depicts a simplified flowchart 850 depicting processing that may be performed by SDI module 206 in the cloud infrastructure system, in accordance with an embodiment of the present invention. The processing depicted in FIG. 8B may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 8B is not intended to be limiting. Other sequences of steps may also be performed according to alternative embodiments. For example, alternative embodiments of the present invention may perform the steps outlined above in a different order. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 8B may be performed by one or more modules in the SDI module 206 discussed in detail in FIG. 6.

Flowchart 850 can be performed for each pre-provisioned assembly. An assembly is one type of POD. For example, assembly is a specific technology used by OVAB for creating. OVAB creates assemblies or deploys assemblies. The pre-provisioning of PODs can continue indefinitely until the Min_used thresholds are reached, or until the timer job is suspended by an operator.

Additionally, if a failure occurs at any step, the preceding operations can be rolled back. SDI module 206 can then retry the sequence again.

At 802, SDI module 206 can acquire IP addresses for pre-provisioning a POD assembly. For example, eight IP addresses (e.g., four from the FRONTEND, four from the BACKEND) can be reserved in the SDI database. The operation can be atomic. In some instances, if the system does not have sufficient IP addresses, an administrator can add more capacity to the environment.

At 804, SDI module can create a virtual assembly builder home (e.g., Oracle Virtual Assembly Builder (OVAB)). For example, a new directory can be created under the root (e.g., ovab.virtual.root) directory and various symlinks can be created back to the home directory (e.g., ovab.master.home). The home directory can be used as the virtual assembly builder home for the single deployment. This can allows SDI module 206 to perform parallel virtual assembly builder (e.g., OVAB) operations without locking issues.

At 806, SDI module 206 can create a deployment plan (e.g., deploymentPlan.xml) file into the new virtual assembly builder (e.g., OVAB) home. The deployment plan can contain the configuration information that will be injected into virtual machines (VMs) deployed by virtual assembly builder (e.g., OVAB) for the deployment such as, but not limited to, IP addresses, network file sharing (NFS) mounts, and VM bridge names.

At 808, SDI module 206 can create ZFS volumes. ZFS is a combined file system and logical volume manager. The features of ZFS include protection against data corruption, support for high storage capacities, integration of the concepts of file system and volume management, snapshots and copy-on-write clones, continuous integrity checking and automatic repair. For example, three volumes are created in the ZFS filer for the deployment. The volumes are mounted on each VM booted as part of this deployment.

At 810, SDI module 206 can a deploy command (e.g., abctl deploy) to deploy assembly. For example, the deploy command can boot one to four VMs via VM Manager.

At 812, SDI module 206 can set the assembly to free in SDI database. For example, SDI module 206 can set USED=0 for the PRE_PROV_JAVA_ASSEMBLY row, which indicates that the POD assembly is read to be assigned to a service instance.

As previously mentioned, standing up a POD can be slow, therefore POD assembly is done ahead of time, so when a customer orders a service, the customer can receive the order quickly (e.g., within seconds or minutes). Spare pooling of pods is based on administrator configurable options (e.g., Min_Used thresholds) to anticipate future demand.

Service Instance Creation

SDI module 206 provides the automation for creating and destroying service instances. It also provides monitoring ability of service instances to support specific business activities such as trial expiration.

The service instance creation API can be used to create new systems and/or service instances. It can be used to create a new system along with one or more service instances that belong to that system or it can be used to create one or more service instances to a pre-existing system. The API can be asynchronous since it may be a long running operation taking minutes or hours depending on our implementation decisions and potential failures that require manual intervention to resolve. Hence this API must take a call back address as one of its arguments. The immediate return value of the call can simply be a request ID that identifies the request for identification for the duration of the fulfillment of the request. The results of the request can be provided via a call back to the address provided. When the callback is made with the response body the system and service instances created by the request can be fully operational and ready for use.

The call back address and the service order document are inputs for the service instance creation API. The call back address can be an address to call back to TAS when the operation has been completed. The service order document can be an XML document that describes an order as processed by the TAS system. The service order document can provide the following information:

Call back address—Address to call back to TAS when the operation has been completed.

System name—name for the new or existing system. System names must be unique across all of cloud architecture as this value will be used for the tenancy name within the shared IDM instance.

Is new system indicator—Boolean value indicating whether this is an order that will create a new system or add services instances to an existing system (Optional) System admin user name—Name of the System/Tenancy administrator account to be created if a new System is being created.

List of service instance orders—1-N system instance orders where each system instance order contains:

Service Instance Name—name of the service instance to be created. System instance names is be unique within a given System.

Admin user name—of the service instance administrator account to be created for this Service Instance Service Instance Type—type of service to be created such as FA CRM, FA HCM, Java, WCC, APEX Service Instance Size—small/medium/large. Every service instance currently has some notion of size Service specific properties—Set of properties that are specific to the type of service that is being created.

The service order fulfillment document can be the output for the service instance creation API. As described above, the return value from this asynchronous call can be a request id that can be used for tracking this request during its lifetime. The response to the request can be sent as a callback to the call back address provided as input. The service order fulfillment document can be an XML document that contains the following information:

Request id—request id returned synchronously to the original API call

System name—System name created or added to by this request (Optional) System/tenancy admin username and temporary password—If this request created a new System, these values can be returned as part of the response. The values may not be returned if the request only resulted in the addition of new services to an existing System.

(Optional) System IDM console URL—If this request create a new System, a URL for the IDM console for this system can be returned.

List of service instance orders—where each service instance order contains:

Service instance name—name of the service instance that was created

Service instance admin username and temporary password—service instance admin account information (Optional) Service instance admin URL—If applicable for the service, a URL to the administrative console for the service instance. For instance, in the case of the Java service this should be a URL leading to the EM console for the Java service.

Service instance URL—URL that takes the user to their newly created service instance.

Additionally, SDI module 206 can have the ability to pre-deploy and associate service instances. Depending on the length of time required to deploy various service instances, the assemblies may be pre-deployed for these services. Therefore, when a user requests a service instance, all that SDI module 206 may need to do is to put any user specific "personality" into the assembly and return it to the user.

Provisioning Request Flow

Once a customer request an order, an SDI provisioning request is requested by TAS in a single SOAP operation. A Provisioning Request can include a bundle of Systems/Services create, read, update and delete (CRUD) operations. A Provisioning Request can be uniquely identified by its Request Id.

Figure 9:
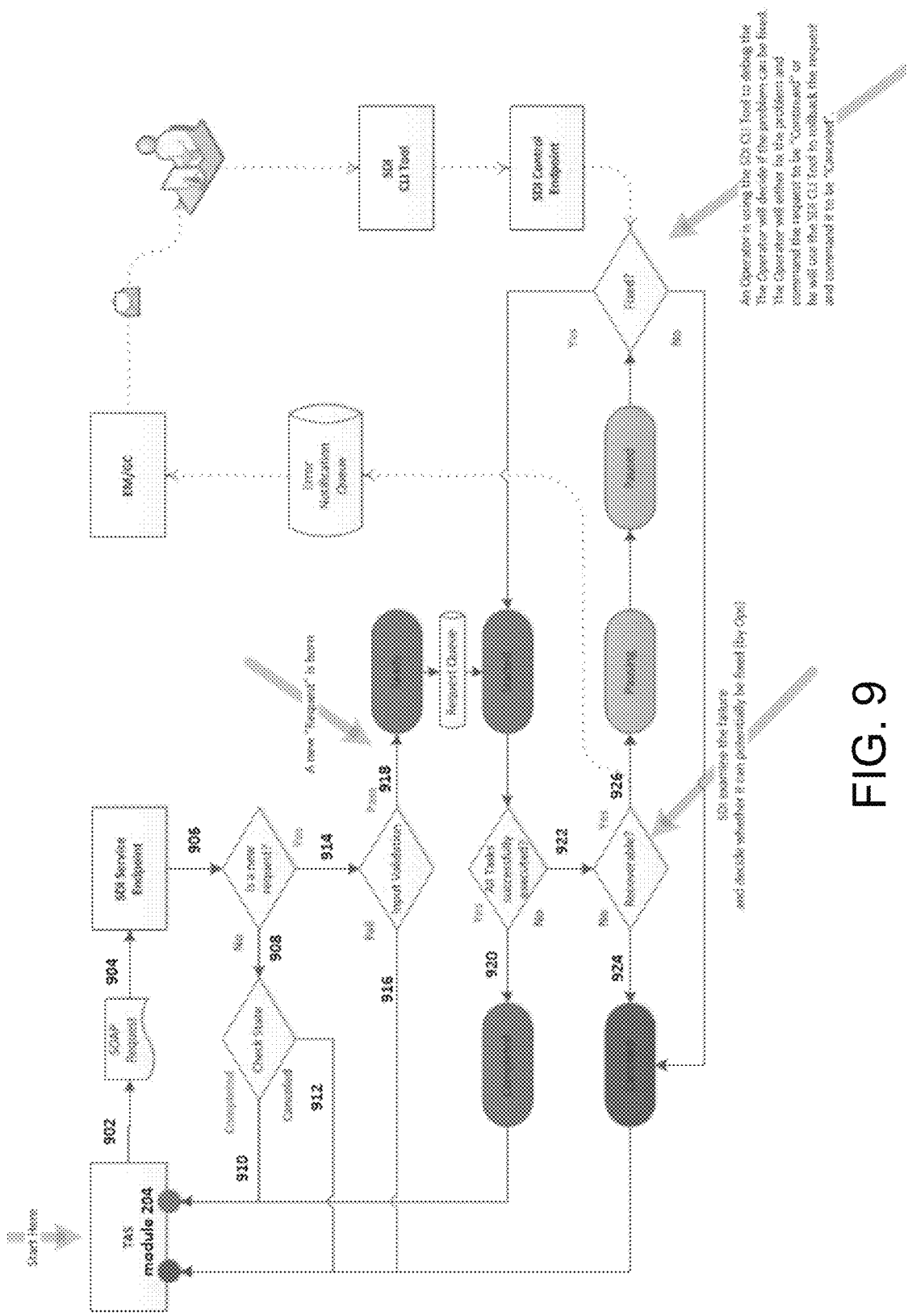
FIG. 9 illustrates a provisioning request flow, according to some embodiments.

FIG. 9 illustrates a provisioning request flow, according to some embodiments. For example, a provisioning request can be initiated by TAS module 204. At 902, TAS module 204 can invokes the relevant provisioning SOAP operation (CRUD) and set the Request id by sending a SOAP request. At 904, upon receiving the SOAP request, SDI can respond with HTTP 202 Code and starts processing the request asynchronously. Additionally, at 906, SDI module 206 can first check if this is a new request, which can be determined by the Request Id. The check at 906 prevents the same request (i.e. a request with the same Request Id) from being re-processed (e.g., when a request is resubmitted the "Reply To" address and "Correlation ID" values, which are used for the TAS callback, are updated to the values of that latest SOAP request).

If the request is not new, at 908, SDI module 206 checks the request state (e.g., from existing SDI database entry). For example, if the state is "completed," then the request was successfully processed before. Then at 910, SDI module 206 can invoke the relevant TAS "orderCompleteCallback." Alternatively, if the state is "cancelled," then the request was unsuccessfully processed before. Then at 912, SDI module 206 can invoke the relevant TAS "onFaultCallback" with fault information.

If the request is new, at 914, the request is continues to be processed. TAS module 204 can be notified when processing completes. SDI module 206 can validate the request. For example, there may be three validation categories such as: input validation, state validation and locks Validation. At 916, if the request is invalid, SDI module 206 can invoke the TAS "onFaultCallback" with the relevant fault information.

If the request is valid, at 918, SDI module creates a new request and the state is set to ready. SDI module 206 starts and continues executing the request. For example, the next task in the task queue is run, after which the next task, and so on until all tasks are completed.

At 920, if all the tasks that are associated with this request were successfully executed, then SDI module 206 can invoke the relevant TAS "orderCompleteCallback" with the order fulfillment.

In the error scenarios, if a request is not completed and a single task has failed, subsequent tasks in the request may not be executed. At 922, SDI module 206 can determine if the error is recoverable. At 924, if the error is non-recoverable, the request state is changed to a canceled state and SDI module 206 can invoke the TAS "onFaultCallback" with the relevant fault information. Additionally, SDI module 206 can add entry to internal error queue. This queue will be polled by EM module 208 to update dashboard and send an alert email to administrator. At 926, if the error is recoverable, SDI module 206 can change the state to a pausing state and from that state to paused state. Additionally, SDI module 206 can add entry to internal error queue. This queue will be polled by EM module 208 to update dashboard and send an alert email to administrator.

Figure 10:
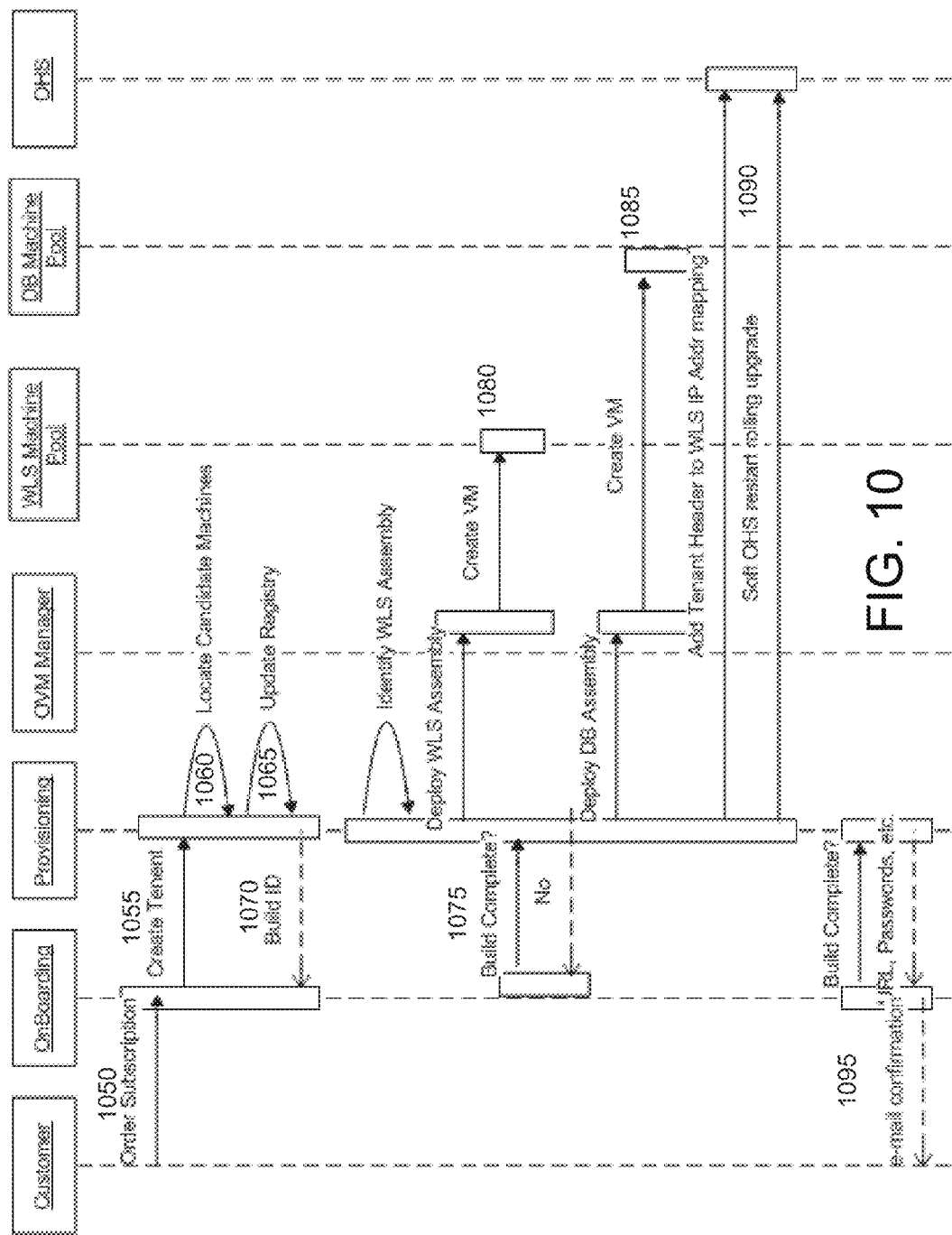
FIG. 10 illustrates an end-to-end flow of provisioning a Java service and a database service together for a customer.

Once a new request for a service is received and validated by SDI module 206, then SDI module 206 provisions the requested service. FIG. 10 illustrates a detail flow of a provisioning example, according to some embodiments. The provisioning process is managed by SDI module 206.

For example, TAS can integrate with the system provisioning module from within the BPEL process. Specifically the system provisioning interface can be exposed as an asynchronous SOAP-based Web Services call and the TAS BPEL processes for the various lifecycle operations can directly call the system provisioning endpoints to perform the provisioning tasks.

Additionally, system provisioning can use callback APIs to send the result to the BPEL process on success or to inform the BPEL process that the operation failed with a fault. On receiving the callbacks, the BPEL process either continues its normal flow with the result, or follows the fault policy to handle the fault.

Example of Provisioning a Java Service and a Database Service

FIG. 10 illustrates an end-to-end flow of provisioning a Java service and a database service together for a customer. For example, at 1050, a customer can order a trial subscription. A customer using the cloud UI can sign up for a free trial of the Java service. The cloud UI can make a PLSQL call to submit the order. In this case, the call may be for two different subscriptions which include a Java service subscription and a database service subscription. It can be submit to TAS module 204 via PLSQL.

At 1055, onboarding can be initiated and TAS module can create tenant call. In the tenant the service type and size can be passed. In this example, there can be two types because the order is for a Java and database service. The corresponding size for a trial may be equals small. Alternatively the size may be larger if the order was a paid order. The create tenant call gets passed to SDI module 206 for provisioning.

At 1060, local candidate machines loop call allows SDI module 206 to look at the available resources to potentially find a pre-provisioned POD. Depending on the service type, the resources may have been pre-pooled and mostly already set up. Alternatively, if the service has not been pre-provisioned, then SDI module 206 may have to start from scratch for provisioning the requested service. For example, for the Java service, SDI module 206 can support pre-provisioning of PODs, where the work of creating virtual machines and standing them up is all done in advance. Therefore, when a customer request comes in, SDI module 206 simply has a smaller step of personality injection. Personal injection includes customizing the pre-provisioned POD with the configuration for a particular customer at runtime. For the database service, SDI module 206 can create the customer footprint on demand. On the other hand, the customer footprint can be a fairly virtual footprint since the database service is using schemas within an existing database. For fusion applications, the personality injection can include rewiring the configuration to match a particular customer's details. In this example, SDI module 206 can choose existing VMs pre-provisioned for the Java service or provisioning a new Java service, which includes pick a rack that has enough resources to stand up a new VM.

At 1065, SDI module 206 can update registry. SDI module 206 can have bookkeeping on board the physical hardware resources to keep track of the underlying virtual machine manager and the virtual machine pools. Additionally, SDI module can keep track of all of the assemblies and VMs that have been created and whether they are, for example, an anonymous assembly that has not been assigned to a customer or an assembly that is bound to a particular customer subscription.

At 1070, the Build ID flows back to the onboarding layer. This can inform TAS module 204 that a system that is being produced or a service is being produced for a particular request. TAS module can asynchronously determine whether the provisioning is done. At 1075, TAS module 204 can poll SDI module 206 and check whether or not a particular request is complete. Alternatively, an asynchronous SOAP request by TAS module 204 can also determine if the request is complete, where TAS 204 waits for a call back.

At 1080, SDI module can use an API (e.g., OVAB Java API) to deploy the weblogic server (WLS) assembly. For example, OVAB can internally make calls to a VM manager in order to create the individual VMs in the assembly. Additionally OVAB can have additional logic when there are multiple VMs in order to interface the multiple VMs in order for the VMs to support a whole WLS domain topology. At 1080 and 1085, SDI module 206 can create the WLS machine pool and DB machine pool. Once the WLS assembly is actually deployed and comes back successfully through VM manager and back through OVAB, SDI module can determine that an anonymous assembly has been created.

Additionally, the anonymous assembly can be incorporated with Nuviaq-based personality injection. For example, SDI module 206 can call the Nuviaq connector and pass physical details and customer specific details in order for Nuviaq to make runtime calls to the running VMs. Nuviaq can reconfigure the web logic domain to match the customer specific information (e.g., the identity domain name chosen by the customer into the URLs).

At 1085, SDI module 206 can provision a database service. For example, the database service can be backed by Exadata hardware database instances that can be preconfigured on Exadata hardware. As further described in FIG. 12, each instance can support many customers. SDI module 206 can register the Exadatas with the DB service itself and manage the Exadata PODs. Furthermore, SDI module 206 can provision the database service using an APEX connector. APEX is application express programming engine on top of the database. The SDI module 206 can pass along relevant information to the APEX connector to provision the database, such as the size of the database service, the customer identity domain name, and so on. Then the APEX connector can allocate additional schemas and table spaces for the customer on the fly. Additionally, a particular Exadata machine may be chosen based on load, and sizing, and so on. The actual schema is returned back to SDI module 206, which can include the connecting information to the schema. SDI module 206 can generates a random credential and passes the credential back to TAS module 204.

At 1090, SDI module 206 can initiate a soft HTTP server (e.g., OHS) restart. SDI module 206 can dynamically generates configuration files with the specific binding for a specific customer which can require a soft restart of OHS. A soft restart allows all the in-flight requests to be completed before restarting. Once the OHS is restarted, then inbound traffic to the POD through the routing tier is possible.

At 1095, a response is sent back to TAS module 204 with the URL for the requested service and the passwords that were generated. The password can be the service administrator or the identity domain administrator password that can be provided to the customer via e-mail for access to the service environment.

Service Provisioning a Java Cloud Service Instance

FIG. 11 illustrates the provisioning of a Java cloud service instance, according to one embodiment. Provisioning of a Java cloud service instance can be performed by Java Service Provisioning Control (JSPC). For example, the provision platform instance use case can be realized by the create platform instance operation of the Java service provisioning control API. In the context of the Public Cloud, a Java cloud service instance corresponds to a JSPC platform instance. A platform instance is assigned a unique identifier that can be used on all subsequent operations related to this instance.

The platform deployment descriptor provided to the create platform instance action allows for properties to be set that modify the configuration of the platform instance to meet the subscription requirements of the tenant. Properties can be used for the following purposes: specify the subscription type/size (the subscription type/size can impact the number of servers, database limits and quality of service settings); indicate whether or not this is a trial subscription; and identify a CRM service to be associated with this WebLogic service instance.

According to one embodiment, SDI module 206 can use a continuous integration server (e.g., Hudson) as the configuration manager. Continuous integration server allow for automating build and deployment. Additionally, continuous integration server can enable interface with cloud services and virtualization technologies such that users can improve resource utilization, reduce maintenance overhead, and respond automatically to sudden system load spikes.

Figure 11A:
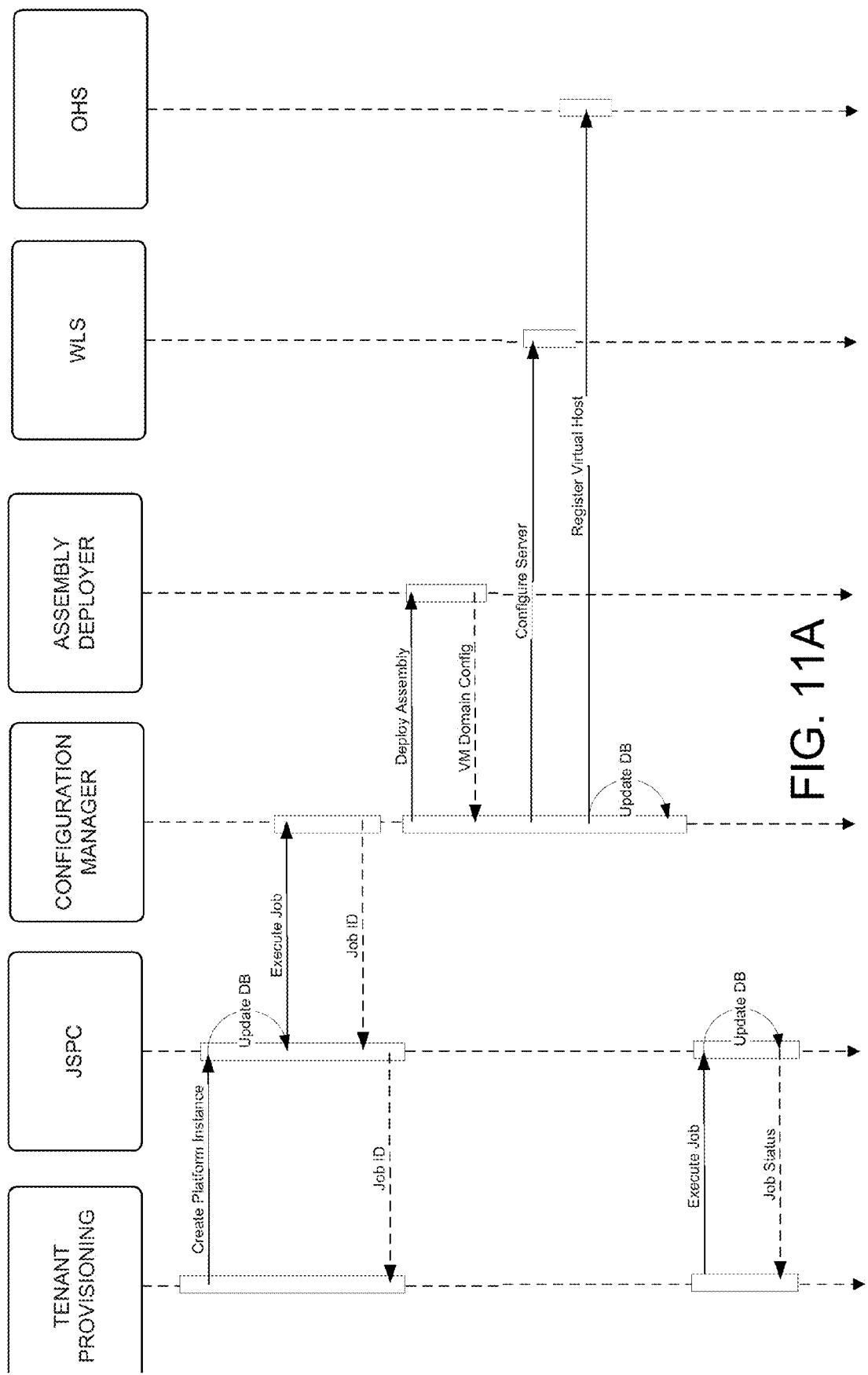
FIG. 11A illustrates the provisioning of a Java cloud service instance, according to one embodiment.
Figure 11B:
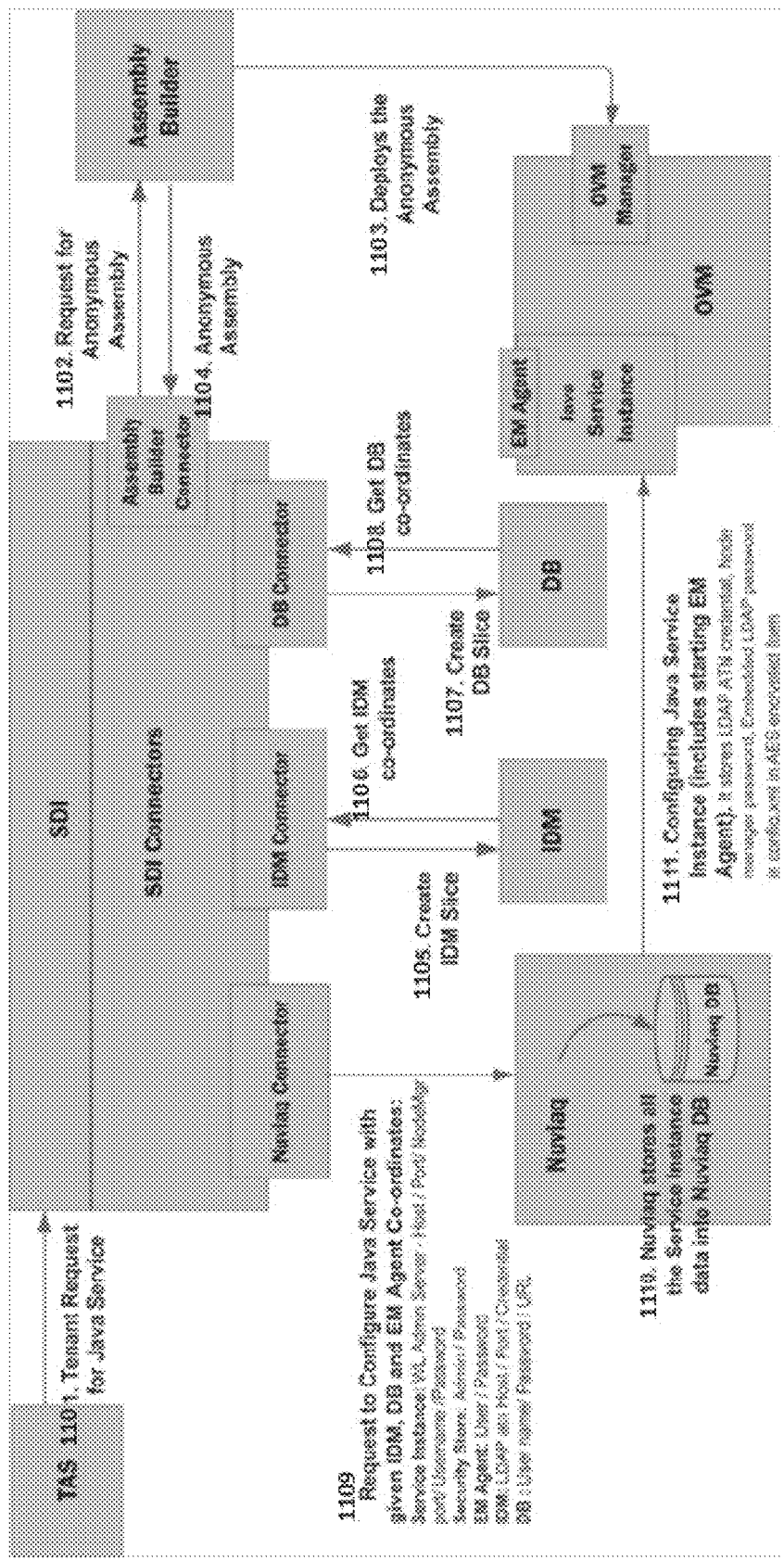
FIG. 11B illustrates the provisioning of a Java cloud service instance and a Fusion application association, according to one embodiment.

FIG. 11B illustrates a high level overview of the various interactions for the provisioning of a Java cloud service instance and a Fusion application association, according to one embodiment. The provisioning of a Java service can be a process which can personalizes a VM based on the requirements of a customer or tenant. As illustrated in FIG. 11B, a Java service can provide extensions to a Fusion application SaaS environment.

FIG. 11B describes how an anonymous assembly is hydrated with personalization information of a tenant. For example, a Java service VM image can be provided as an OVAB assembly. The deployment of such an assembly results in an anonymous instance. As mentioned in FIG. 8B, SDI module can pre-provision an anonymous instance of a service. The anonymous instance is a live VM, but is not associated with any tenant. As previously described, SDI module 206 can pre-provision anonymous VMs to speed up the process of creating a tenant environment or service instance.

At 1101, TAS module 204 can send a tenant request for Java service to SDI module 206. At 1102, SDI module 206 can request for anonymous assembly from an assembly builder via the assembly builder connector. At 1103, the assembly builder can deploy the anonymous assembly using OVM. At 1104, the anonymous assembly is sent to SDI module 206. At 1105, SDI module 206 can create IDM slice via the IDM connector. At 1106, IDM can return the IDM coordinates to SDI module 206. At 1107, SDI module 206 can create a database slice via the database connector. At 1108, the database can return the database coordinate to SDI module 206. In some instances, the database can be an APEX database service.

At 1109, SDI module 206 can request to configure Java service with the received IDM, database and EM coordinates via the Nuviaq connector. At 1110, Nuviaq can store all the service instance data into a Nuviaq database. At 1111, Nuviaq can configure Java service instance, which may also include starting the EM agent. In some instances, Nuviaq can be a Java service orchestrator.

Furthermore, using Fusion applications (FA) SaaS environment can require Java service to be properly provisioned according to the FA SaaS tenant. Therefore, the provisioning process described in FIG. 11B may have to account for certain differences related to Identity Management.

In a typical cloud PaaS (e.g., Java service, database service) provisioning environment, there can be single shared IDM servicing all tenants. Each tenant's security information can be segregated in a IDM stripe (e.g., identity domain) which can be kept separate from the other tenants. In the case of FA SaaS, the IDM may be different and dedicated to each SaaS instance. Therefore, the integration of the Java service and FA service can require that there is an interaction between the IDMs in order to support functionality like single sign-on.

According to some embodiments, during the provisioning of associated services, SDI module can use a shared IDM between SaaS and PaaS services. Based on the shared IDM between SaaS and PaaS services, the following are use-cases that can be supported: partners/customers building applications in Java cloud services that integrate with FA web services; partners/customers building applications in Java cloud services that have a user-interface which get embedded in FA; impact due to test and production instances; migration between test and production instances; federation of user with on-premise; and federation of actual user with on-premise for some users with cloud identity store for other users.

Figure 11C:
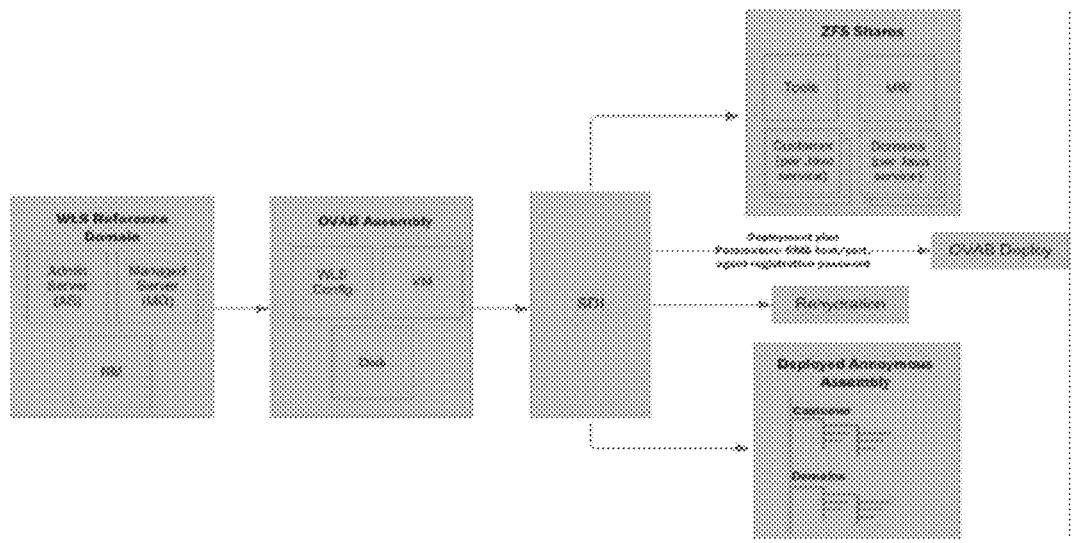
FIG. 11C illustrates a PaaS and a SaaS service association process, according to some embodiments of the invention.
Figure 11C:
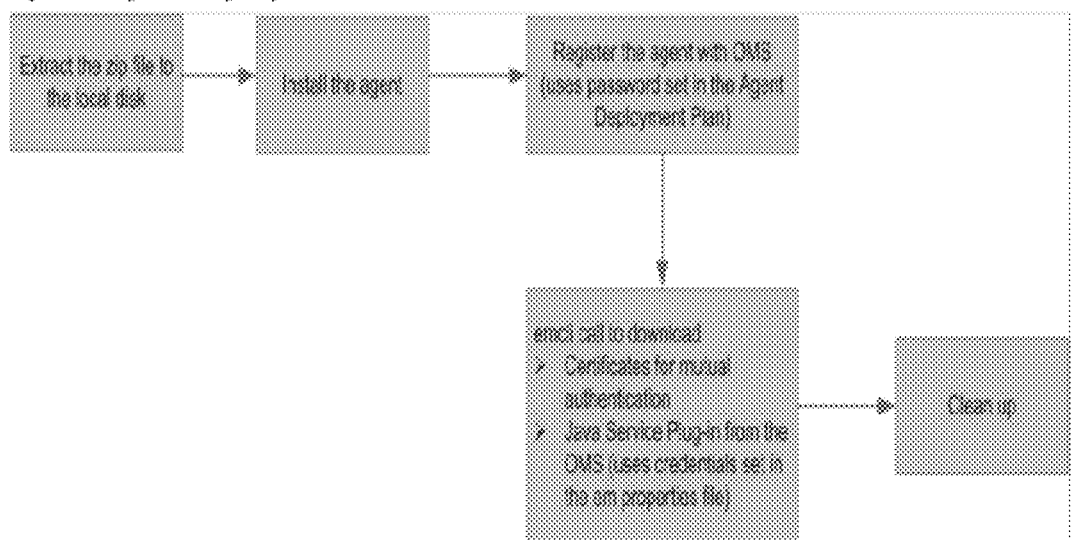

FIG. 11C illustrates a PaaS and a SaaS service association process, according to some embodiments of the invention. The PaaS (e.g., Java) service and SaaS (e.g., FA) service association process can include a PaaS environment hydration. For example, the Java service PaaS environment can include hydration scripts which are invoked during provisioning. The scripts can be capable of performing various tasks like configuring the PaaS domain and so on. The tasks can include: changing firewall rules to allow PaaS and SaaS interactions; investigate the changes required for authentication servlet filters; add necessary hooks to the puppet repository for execution during hydration; shared IDM integration; and web services configuration changes.

Service Provisioning a Database Cloud Service

Figure 12:
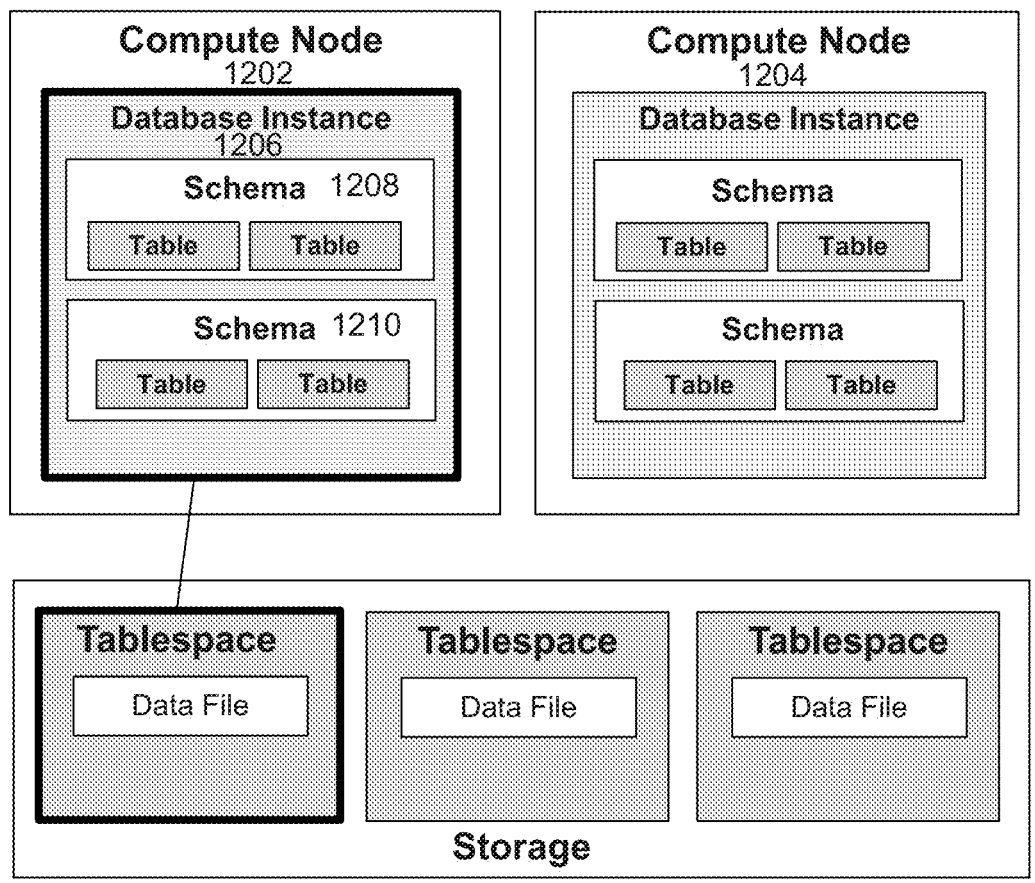
FIG. 12 illustrates a high level logical view of a database cloud service, according to some embodiments.

FIG. 12 illustrates a high level logical view of a database cloud service, according to some embodiments. A cloud database service can be provisioned by SDI module 206. The database cloud service can have three main components: web service access, which allows access to the data in the database cloud service through simple URIs; Application Express, for creating and deploying all varieties of applications in a browser-based environment; and a set of business productivity applications that can be easily installed (e.g., with just a few clicks).

Some key attributes of the multi-tenant shared architecture can include: each tenant gets a completely isolated schema; each Exadata compute node has multiple database instances; each instance has multiple schemas (e.g., tenants); each schema/tenant is a container that can manage database objects including tables, views, stored procedures, triggers; each schema has one dedicated tablespace; and each tablespace has one data file.

FIG. 12, which is similar to FIG. 7E, illustrates an example of having multiple compute nodes (e.g., EXADATA compute node 1202, EXADATA compute node 1204) within the same physical machine. Additionally, a database instance 1206 can reside within each compute node. Furthermore, two separate schemas (e.g., schema 1208, schema 1210) can be included within each database instance 1206. According to another embodiment, more than two schemas can be included in one database instance. Each schema (e.g., schema 1208, schema 1210) can be for a different customer. Therefore, in some embodiments, multiple schemas that are associated with different customers can reside within the same database instance.

In current database implementations, only one customer can reside within each database instance. Therefore, multiple customers require multiple database instances. Alternatively, according to the embodiments of the present invention, the database instance can be shared among multiple customers, since multiple schemas are included in one database instance. Each schema can represent a tenant; therefore, one database instance can have multiple tenants.

For example, Fusion applications and Java service are single tenant services. Single tenant services are assigned to one customer. The database service is a multi-tenant service. The POD for a database service is an Exadata rack with a couple of database instances on the rack. In this case, many customers can use one POD. Therefore, a database service is a multi-tenant service, because a POD can have multiple customers, This allows for a one-time setup of a POD and then the runtime provisioning by SDI module 206 to add multiple tenants to the POD at runtime.

Figure 13:
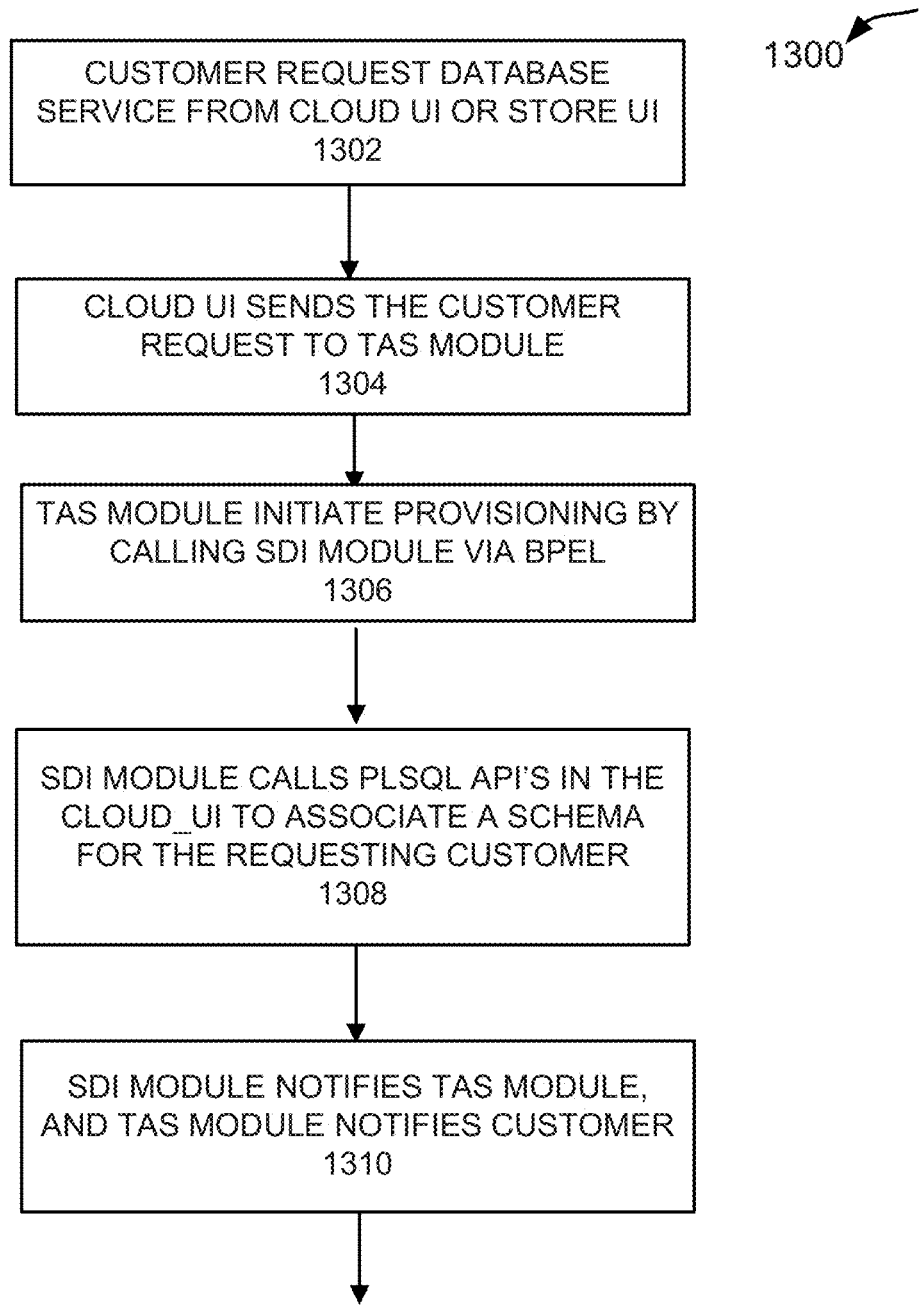
FIG. 13 illustrates a service provisioning flow for a multi-tenant database service, according to some embodiments.

FIG. 13 illustrates a service provisioning flow 1300 for a multi-tenant database service, according to some embodiments. As illustrated in FIG. 12, a database service is an example of a multi-tenant service, since one database instance can have multiple schemas that are associated with different customers.

At 1302, a customer requests a database service from cloud UI 212 for a trial service. Alternatively, a customer can request a database service from the store UI 210 for a paid service. At 1304, cloud UI 212 sends the customer request to TAS module 204. At 1306, TAS module 204 can initiate provisioning by calling SDI module 206 via BPEL. In some instances, TAS module 204 can initiate provisioning only when services are available. At 1308, SDI module 206 can call PLSQL APIs in the CLOUD_UI to associate a schema for the requesting customer. At 1310, after successful association, SDI module 206 can notify TAS module 204, and TAS module 204 can notify (e.g., email) customer. Subsequently, the customer logs into webserver and activates the database service.

According to another embodiment, a service provisioning for a Fusion application can be implemented. For example, a new Fusion application subscription order is received by SDI module 206. Upon approval of the order, a Fusion application POD is provisioned. The customer (e.g., tenant) provides key information to enable the tenant to be setup in that pod. Upon creation of the initial user, the Fusion applications cloud service emails the user ID and password to the initial user. Furthermore, the tenant provisioning to an allocation pod is a subset of the standard setup process an on-premise customer would follow.

Figure 14:
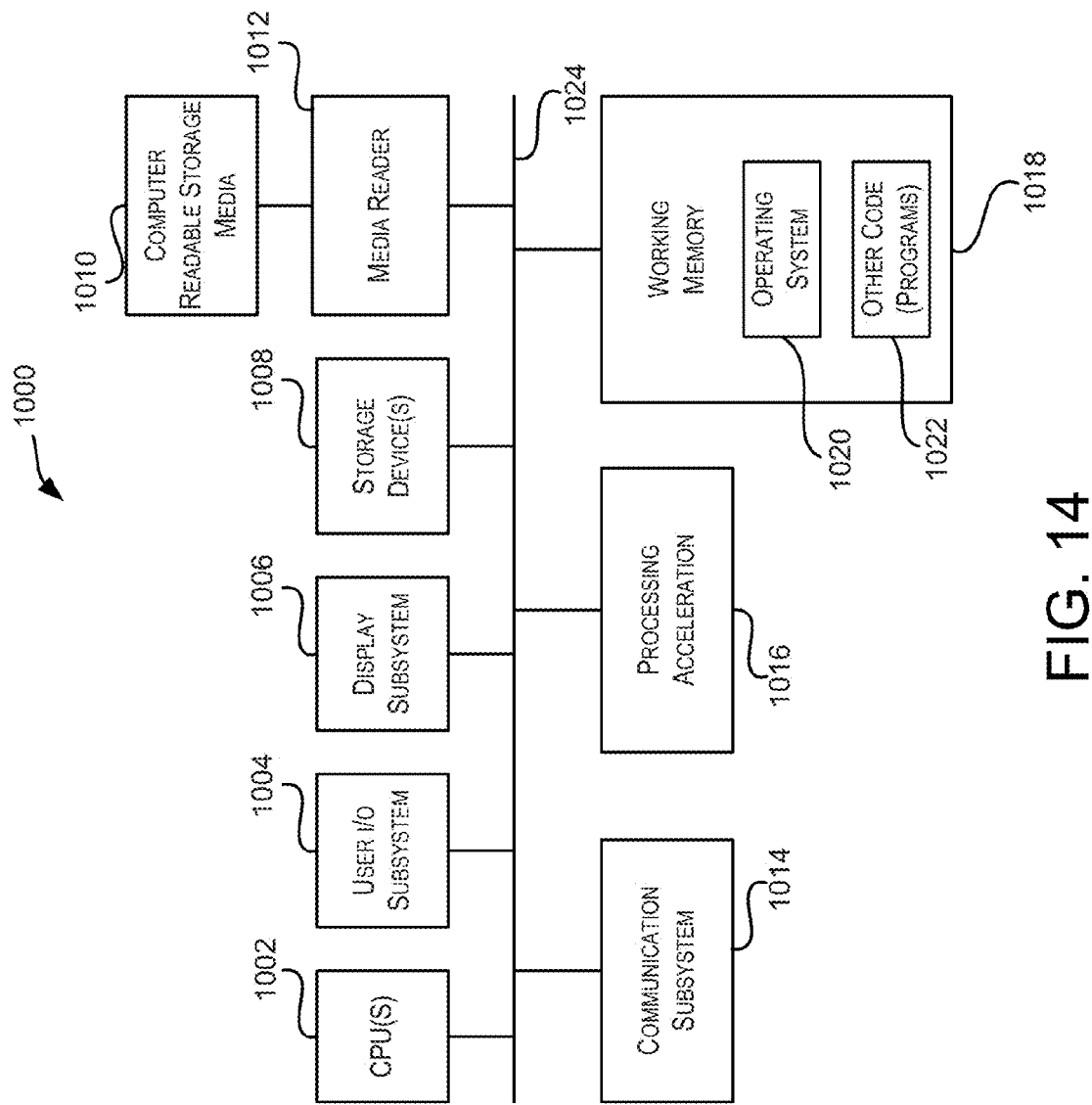
FIG. 14 is a simplified block diagram of a computing system 1000 that may be used in accordance with embodiments of the present invention.

FIG. 14 is a simplified block diagram of a computing system 1000 that may be used in accordance with embodiments of the present invention. For example, cloud infrastructure system 100 may comprise one or more computing devices. System 1000 depicted in FIG. 14 may be an example of one such computing device. Computer system 1000 is shown comprising hardware elements that may be electrically coupled via a bus 1024. The components may include one or more processing units 1002, an input subsystem 1004, an output subsystem 1006, storage devices 1008, a computer-readable storage media reader 1012 connected to a computer-readable storage medium 1010, a communication subsystem 1014, a processing acceleration subsystem 1016, and working memory 1018.

Bus subsystem 1024 provides a mechanism for letting the various components and subsystems of computer system 1000 communicate with each other as intended. Although bus subsystem 1024 is shown schematically as a single bus, alternative embodiments of the bus subsystem may utilize multiple busses.

Input subsystem 1004 may include one or more input devices such as a mouse, a keyboard, a pointing device, a touchpad, etc. In general, input subsystem 1004 may include any device or mechanism for inputting information to computer system 1000.

Output subsystem 1006 may include one or more output devices for outputting information from computer system 1000. Examples of output devices include without limitation a display device, a printer, a projection device, etc. In general, output subsystem 1006 may include any device or mechanism for outputting information from computer system 1000.

Processing unit(s) 1002 can include one or more processors, one or more cores of processors, combinations thereof, and the like. In some embodiments, processing unit(s) 1002 can include a general purpose primary processor as well as one or more special purpose co-processors such as graphics processors, digital signal processors, or the like. In some embodiments, some or all processing units 1002 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1002 can execute instructions stored in working memory 1018 or on storage devices 1008. In various embodiments, processing units 1002 can execute a variety of programs or code instructions and can maintain multiple concurrently executing programs or processes. At any given time, some or all of the program code to be executed can be resident in system working memory 1018, storage devices 1008, and/or on computer-readable storage media 1010. Through suitable programming, processing units 1002 can provide various functionalities described above for performing event stream-related processing. In some embodiments, computer system 1000 may also include a processing acceleration unit 1016, which can include a digital signal processor (DSP), a special-purpose processor, and/or the like.

Storage device(s) 1008 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1002 to provide the functionality described above, may be stored on storage devices 1008. Storage devices 1008 may also provide a repository for storing data used in accordance with embodiments of the present invention.

Computer-readable storage media reader 1012 can further be connected to a computer-readable storage medium 1010, together (and, optionally, in combination with storage device(s) 1008) comprehensively representing remote, local, fixed, and/or removable memory storage devices plus storage media for temporarily and/or more permanently containing computer-readable information.

Communications subsystem 1014 may permit data to be exchanged with network and/or any other computers. Communication subsystem 1014 serves as an interface for receiving data from and transmitting data to other systems from computer system 1000. The communication may be provided using wired or wireless protocols. For example, communication subsystem 1014 may enable computer 1000 to connect to a client device via the Internet. Communication subsystem 1014 may comprise a modem, a network card (wireless or wired), an infra-red communication device, a GPS receiver, etc.

Working memory subsystem 1018 may include a number of memories including a main random access memory (RAM) for storage of instructions and data during program execution and a read only memory (ROM) in which fixed instructions are stored. Software elements such as an operating system 1020 and/or other code 1022, such as an application program (which may be a client application, Web browser, mid-tier application, RDBMS, etc.), may be stored in working memory 1018. In an exemplary embodiment, working memory 1018 may include executable code and associated data structures (such as caches) used for processing events and enabling variable duration windows processing as described above.

It should be appreciated that alternative embodiments of computer system 1000 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

That which is claimed is:

1. A method comprising:
   storing, by a cloud infrastructure system comprising one or more computing devices, subscription order information associated with a customer, the subscription order information identifying a first service from a set of cloud services provided by the cloud infrastructure system, wherein the subscription order information includes a customer-specific configuration for the first service identified by the subscription order information;
   providing a first set of pre-provisioned anonymous deployments for a first service type, each pre-provisioned anonymous deployment in the first set comprising one or more resources enabling a service instance of the first service type;
   providing a second set of pre-provisioned anonymous deployments for a second service type, each pre-provisioned anonymous deployment in the second set comprising one or more resources enabling a service instance of the second service type;
   determining, by the one or more computing devices, that the first service identified by the subscription order information is associated with a first service type;
   in response to the determining, selecting, by the one or more computing devices, a first pre-provisioned anonymous deployment for enabling the first service; and
   creating, by the one or more computing devices, a service instance using the selected first pre-provisioned anonymous deployment based on the subscription order information associated with the customer, wherein the creating includes customizing the selected first pre-provisioned anonymous deployment with the customer-specific configuration.

2. The method of claim 1, wherein the first service is a database service, and wherein the deployment includes one or more virtual machines (VMs) created using a virtual assembly builder, and wherein the method further comprises:
   creating a deployment plan file, wherein the deployment plan file includes configuration information for injecting the customer-specific configuration into the one or more VMs.

3. The method of claim 2, further comprising:
   creating a virtual assembly builder home to allow parallel virtual assembly builder operations.

4. The method of claim 1, wherein the first pre-provisioned anonymous deployment is for a multi-tenant service, and wherein the multi-tenant service includes service instances for a plurality of customers.

5. The method of claim 4, wherein the multi-tenant service is a database service instance, and wherein multiple schemas are included in the database service instance, wherein each of the schemas is associated with a different customer.

6. The method of claim 1, wherein the first pre-provisioned anonymous deployment is for a single-tenant service wherein the single-tenant service is a Java instance for a particular customer.

7. The method of claim 1, wherein the first pre-provisioned anonymous deployment includes one or more software resources, one or more hardware resources, or a combination thereof for enabling the service of the service type.

8. The method of claim 1, further comprising:
   enabling the first service identified by the subscription order information by assigning the created service instance to the customer based on the pre-provisioned anonymous deployment.

9. The method of claim 1, wherein the first pre-provisioned anonymous deployment is created prior to the subscription order information being stored.

10. A system comprising:
    one or more computing devices configured to offer a set of cloud services;
    a memory configured to store subscription order information associated with a customer, the subscription order information identifying a first service from a set of cloud services, wherein the subscription order information includes a customer-specific configuration for the first service identified by the subscription order information; and
    wherein the one or more computing devices is configured to:
       provide a first set of pre-provisioned anonymous deployments for a first service type, each pre-provisioned anonymous deployment in the first set comprising one or more resources enabling a service instance of the first service type;
       provide a second set of pre-provisioned anonymous deployments for a second service type, each pre-provisioned anonymous deployment in the second set comprising one or more resources enabling a service instance of the second service type;
       determine that the first service identified by the subscription order information is associated with a first service type;
       in response to the determining, select a first pre-provisioned anonymous deployment for enabling the first service; and
       create a service instance using the selected first pre-provisioned anonymous deployment based on the subscription order information associated with the customer, wherein the creating includes customizing the selected first pre-provisioned anonymous deployment with the customer-specific configuration.

11. The system of claim 10, wherein the first service is a database service, and the deployment includes one or more virtual machines (VMs) created using a virtual assembly builder, and wherein the method further configured to:
    create a deployment plan file, wherein the deployment plan file includes configuration information for injecting the customer-specific configuration into the one or more VMs.

12. The system of claim 11, wherein the one or more computing devices are further configured to:
    create a virtual assembly builder home to allow parallel virtual assembly builder operations.

13. The system of claim 10, wherein the first pre-provisioned anonymous deployment is for a multi-tenant service, wherein the multi-tenant service includes service instances for a plurality of customers.

14. The system of claim 10, wherein the first pre-provisioned anonymous deployment is for a single-tenant service, wherein the single-tenant service is a Java instance for a particular customer.

15. One or more non-transitory computer-readable media storing computer-executable instructions for a cloud infrastructure system configured to offer a set of cloud services, wherein the computer-executable instructions, when executed by one or more computing devices in the cloud infrastructure system, cause the one or more computing devices to:
- store subscription order information associated with a customer identifying a first service from a set of cloud services, wherein the subscription order information includes a customer-specific configuration for the first service identified by the subscription order information;
- provide a first set of pre-provisioned anonymous deployments for a first service type, each pre-provisioned anonymous deployment in the first set comprising one or more resources enabling a service instance of the first service type;
- provide a second set of pre-provisioned anonymous deployments for a second service type, each pre-provisioned anonymous deployment in the second set b comprising one or more resources enabling a service instance of the second service type;
- determine that the first service identified by the subscription order information is associated with a first service type;
- in response to the determining, select a first pre-provisioned anonymous deployment from the first set for enabling the first service; and
- create a service instance using the selected first pre-provisioned anonymous deployment based on the subscription order information associated with the customer, wherein the creating includes customizing the selected first pre-provisioned anonymous deployment with the customer-specific configuration.

16. The one or more non-transitory computer-readable media of claim 15, wherein the first pre-provisioned anonymous deployment includes one or more virtual machines (VMs) created using a virtual assembly builder, the one or more computer-readable media, and wherein the computer readable media further comprises instructions to:
- create a deployment plan file, wherein the deployment plan file includes configuration information for injecting the customer-specific configuration into the one or more VMs.

17. The one or more non-transitory computer-readable media of claim 16, wherein the computer-executable instructions, when executed by the one or more computing devices, further cause the one or more computing devices to:
- create a virtual assembly builder home to allow parallel virtual assembly builder operations.

18. The one or more non-transitory computer-readable media of claim 15, wherein first the pre-provisioned anonymous deployment is for a multi-tenant service, wherein the multi-tenant service includes service instances for a plurality of customers.

19. The one or more non-transitory computer-readable media of claim 18, wherein the multi-tenant service is a database service instance, wherein multiple schemas are included in the database service instance, wherein each of the schemas is associated with a different customer.

20. The one or more non-transitory computer-readable media of claim 15, wherein the first pre-provisioned anonymous deployment is for a single-tenant service, wherein the single-tenant service is a Java instance for a particular customer.

\* \* \* \* \*

UNITED STATES PATENT AND TRADEMARK OFFICE
CERTIFICATE OF CORRECTION

| | |
|---|---|
| PATENT NO. | : 9,501,541 B2 |
| APPLICATION NO. | : 13/844018 |
| DATED | : November 22, 2016 |
| INVENTOR(S) | : Jeffrey Ryan Doering et al. |

It is certified that error appears in the above-identified patent and that said Letters Patent is hereby corrected as shown below:

On the Title Page

Page 3
Under Other Publications:

Column 1, Line 24:
Replace "Using Idapsearch, ..." with -- Using Ldapsearch, --.

Column 1, Line 26:
Replace "...(copyright), 2 pages." with -- (copyright 2010), 3 pages. --.

Page 4
Under Other Publications:

Column 1, Line 63:
Replace "...Realibily..." with -- Reliability --.

In the Specification

Column 1, Line 15:
Replace "STRUCTURE;" with -- STRUCTURE; and --.

Column 1, Line 16:
Before "U.S. Provisional" insert -- (3) --.

Column 1, Line 18:
Delete "(4) U.S. Provisional Application no. 61/801,160, filed Mar. 15, 2013, entitled SEPARATION OF POD PROVISIONING AND SERVICE PROVISIONING; and (5) U.S. Provisional Application No. 61/794,427, filed Mar. 15, 2013, entitled CLOUD INFRASTRUCTURE.".

Signed and Sealed this
Third Day of July, 2018

Andrei Iancu
*Director of the United States Patent and Trademark Office*

CERTIFICATE OF CORRECTION (continued)
U.S. Pat. No. 9,501,541 B2

Column 24, Line 24:
After "configuration" insert -- . --.
In the Claims

Column 37, Line 55:
In Claim 5, replace "...and wherein multiple..." with -- wherein multiple --.

Column 37, Line 60:
In Claim 6, replace "...service wherein..." with -- service, wherein --.